United States Patent
Angood

(10) Patent No.: US 11,768,067 B2
(45) Date of Patent: Sep. 26, 2023

(54) COORDINATE POSITIONING ARM

(71) Applicant: RENISHAW PLC, Wotton-under-Edge (GB)

(72) Inventor: Stephen Mark Angood, Truro (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 17/784,946

(22) PCT Filed: Dec. 10, 2020

(86) PCT No.: PCT/GB2020/053164
§ 371 (c)(1),
(2) Date: Jun. 13, 2022

(87) PCT Pub. No.: WO2021/116685
PCT Pub. Date: Jun. 17, 2021

(65) Prior Publication Data
US 2023/0011959 A1    Jan. 12, 2023

(30) Foreign Application Priority Data
Dec. 11, 2019    (GB) ...................................... 1918165

(51) Int. Cl.
*G01B 5/008*    (2006.01)
*B25J 9/04*    (2006.01)
(Continued)

(52) U.S. Cl.
CPC .............. *G01B 5/008* (2013.01); *B25J 9/046* (2013.01); *B25J 13/088* (2013.01); *B25J 18/002* (2013.01); *G01B 21/04* (2013.01)

(58) Field of Classification Search
CPC .................................................. G01B 5/008
(Continued)

(56) References Cited

U.S. PATENT DOCUMENTS 4,606,696 A    8/1986    Slocum
5,611,147 A *  3/1997    Raab .................... G05B 19/401
                                                33/503
(Continued)

FOREIGN PATENT DOCUMENTS

BE        1000768 A4      3/1989
DE    102017128736 A1      6/2019
EP        2732934 A2      5/2014

OTHER PUBLICATIONS

Mar. 16, 2021 International Search Report issued in International Patent Application No. PCT/GB2020/053164.
(Continued)

*Primary Examiner* — George B Bennett
(74) *Attorney, Agent, or Firm* — Oliff PLC

(57) ABSTRACT

A coordinate positioning arm includes: a base end and a head end; a drive frame for moving the head end relative to the base end; and a metrology frame for measuring a position and orientation of the head end relative to the base end. The drive frame includes a plurality of drive axes arranged in series between the base end and the head end. The metrology frame includes a plurality of metrology axes arranged in series between the base end and the head end. The metrology frame is adapted and arranged to be substantially separate and/or independent from the drive frame, for example by supporting the metrology frame substantially only at the base end and head end and by providing the metrology frame with sufficient degrees of freedom (via the metrology axes) to avoid creating an additional constraint between the metrology frame and the drive frame.

31 Claims, 24 Drawing Sheets

(51) Int. Cl.
  *B25J 13/08* (2006.01)
  *B25J 18/00* (2006.01)
  *G01B 21/04* (2006.01)

(58) Field of Classification Search
  USPC .......................................................... 33/503
  See application file for complete search history.

(56) References Cited

U.S. PATENT DOCUMENTS

| | | | |
|---|---|---|---|
| 6,882,901 B2 | 4/2005 | Gong | |
| 7,395,606 B2 | 7/2008 | Crampton | |
| 7,591,078 B2 | 9/2009 | Crampton | |
| 7,954,250 B2* | 6/2011 | Crampton | G01B 21/047 |
| | | | 33/503 |
| 10,830,567 B2* | 11/2020 | Angood | G01B 5/008 |
| 11,644,298 B2* | 5/2023 | Hamner | G01B 7/012 |
| | | | 33/503 |
| 2004/0073335 A1 | 4/2004 | Gong | |
| 2005/0166413 A1* | 8/2005 | Crampton | G01B 5/008 |
| | | | 33/503 |
| 2008/0235970 A1 | 10/2008 | Crampton | |
| 2015/0153149 A1* | 6/2015 | Pettersson | G01B 5/008 |
| | | | 33/503 |
| 2016/0187225 A1* | 6/2016 | Dietz | G01B 5/285 |
| | | | 33/556 |
| 2021/0039259 A1* | 2/2021 | Duprez | G01B 21/042 |
| 2021/0318112 A1* | 10/2021 | Haverkamp | B25J 13/088 |
| 2022/0048198 A1* | 2/2022 | Jonas | B25J 9/06 |
| 2022/0178670 A1* | 6/2022 | Angood | G01B 5/008 |

OTHER PUBLICATIONS

Mar. 16, 2021 Written Opinion issued in International Patent Application No. PCT/GB2020/053164.

Kenneth Levenberg. "A Method for the Solution of Certain Non-Linear Problems in Least Squares". Quarterly of Applied Mathematics, 1944, vol. 2, pp. 164-168.

Donald Marquardt. "An Algorithm for Least-Squares Estimation of Nonlinear Parameters". SIAM Journal on Applied Mathematics, 1963, vol. 11, No. 2, pp. 431-441.

* cited by examiner

FIG. 2
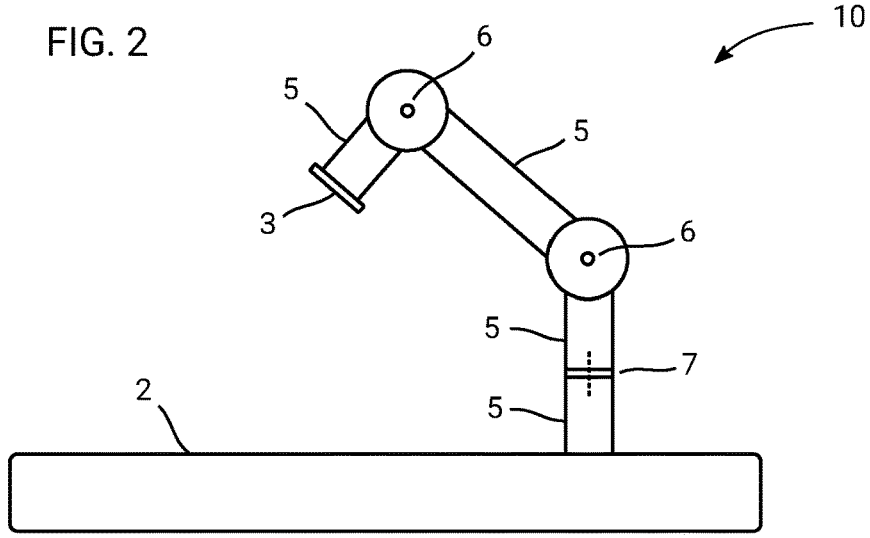
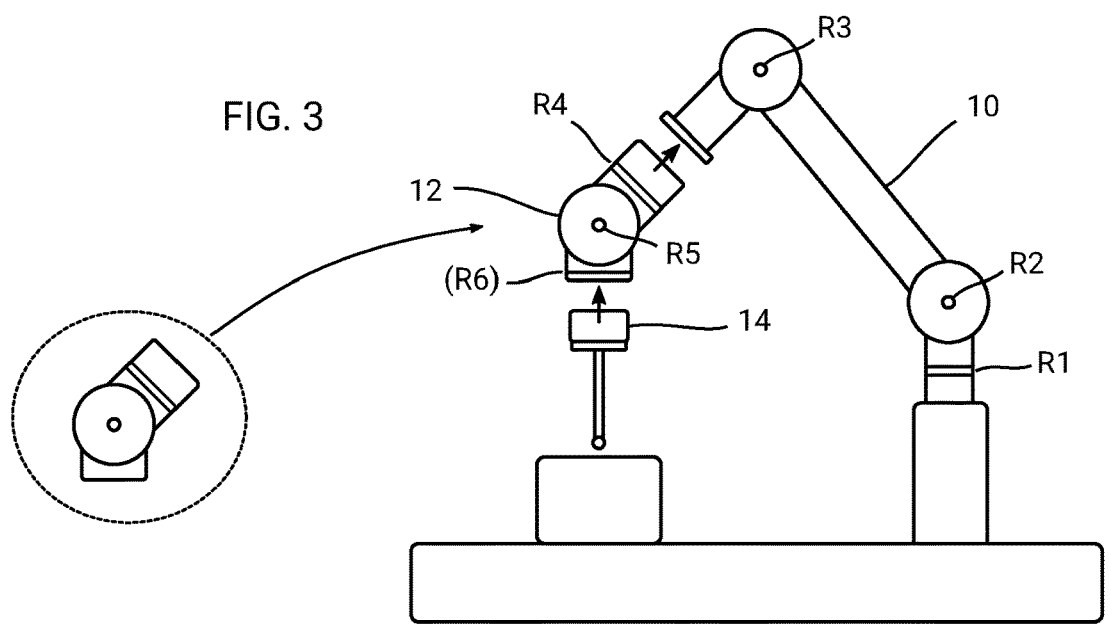
FIG. 3
FIG. 4
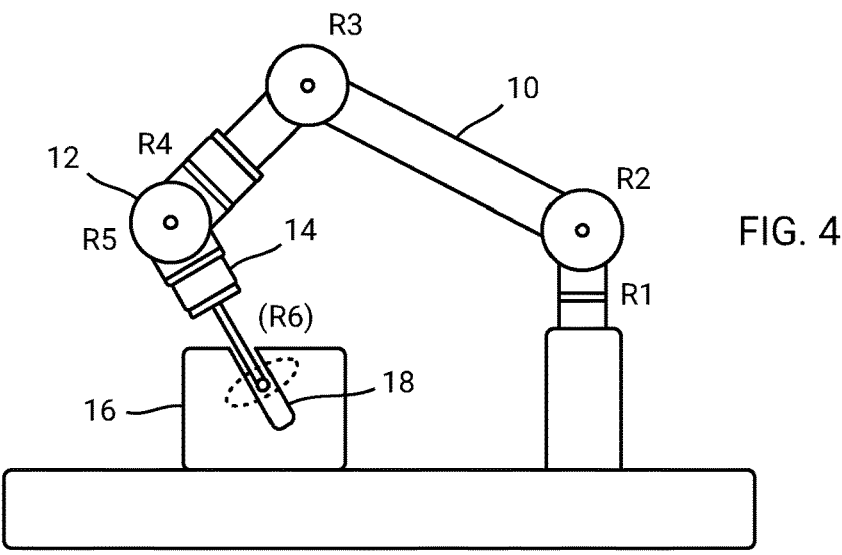

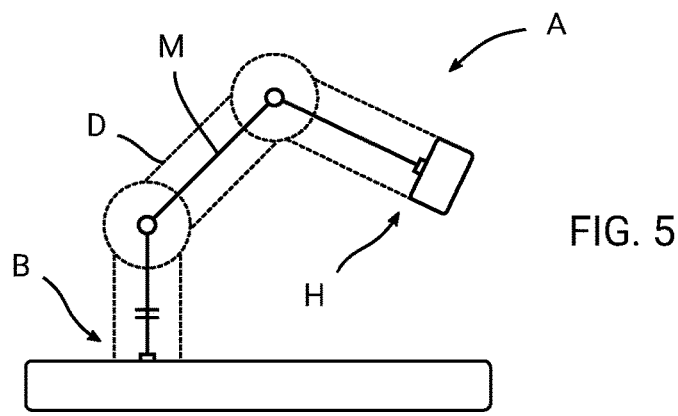
FIG. 5
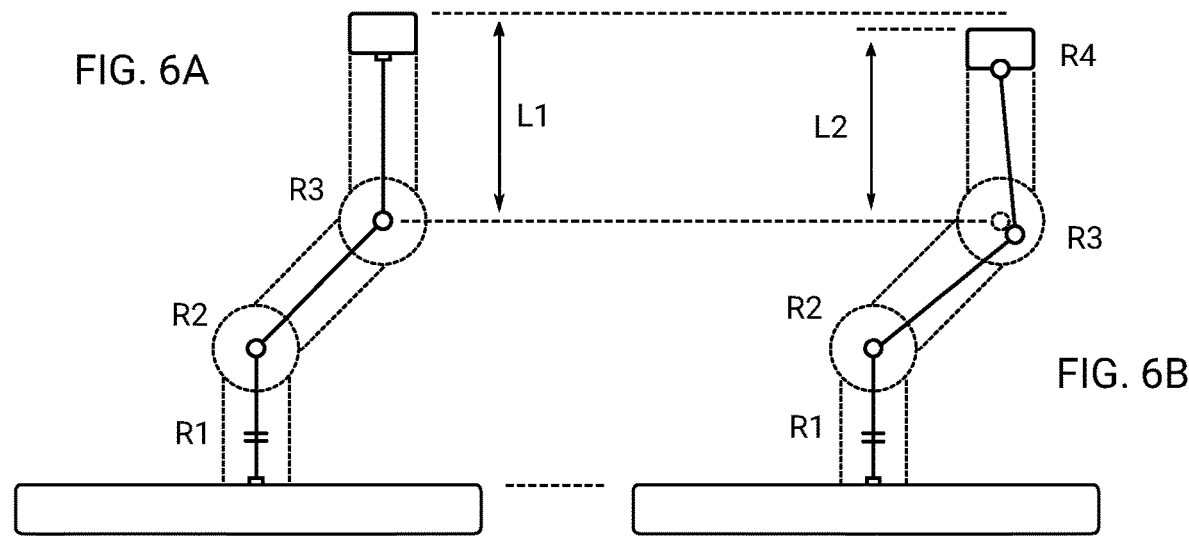
FIG. 6A
FIG. 6B
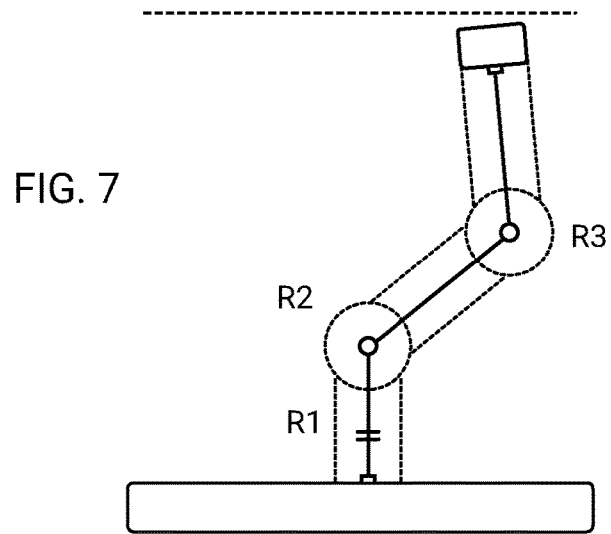
FIG. 7

FIG. 20
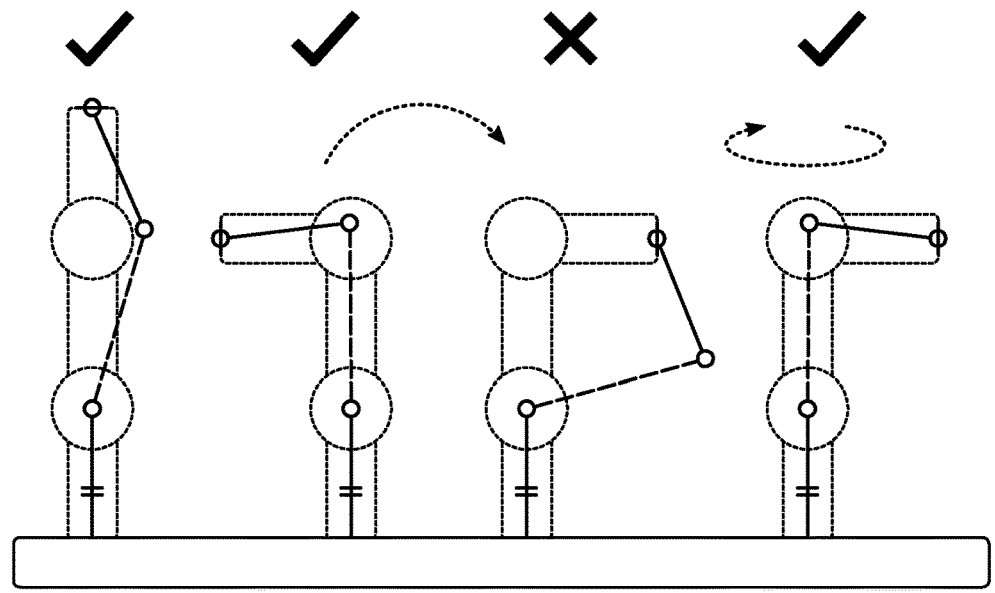
FIG. 21A
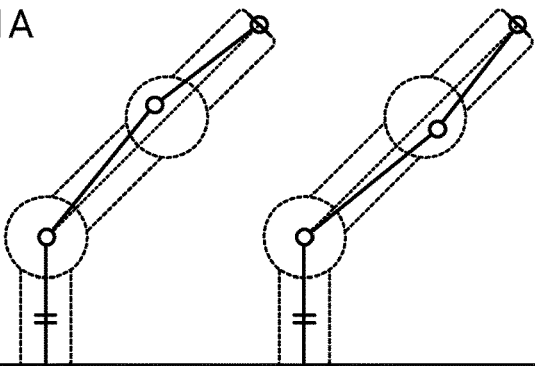
FIG. 21B
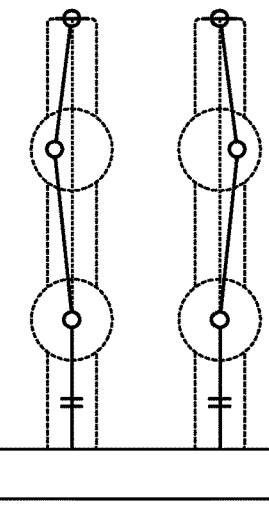
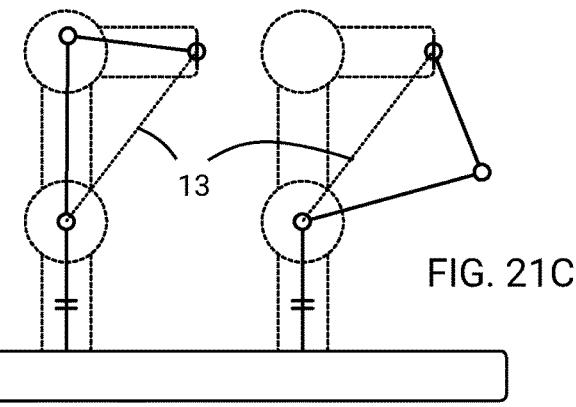
FIG. 21C

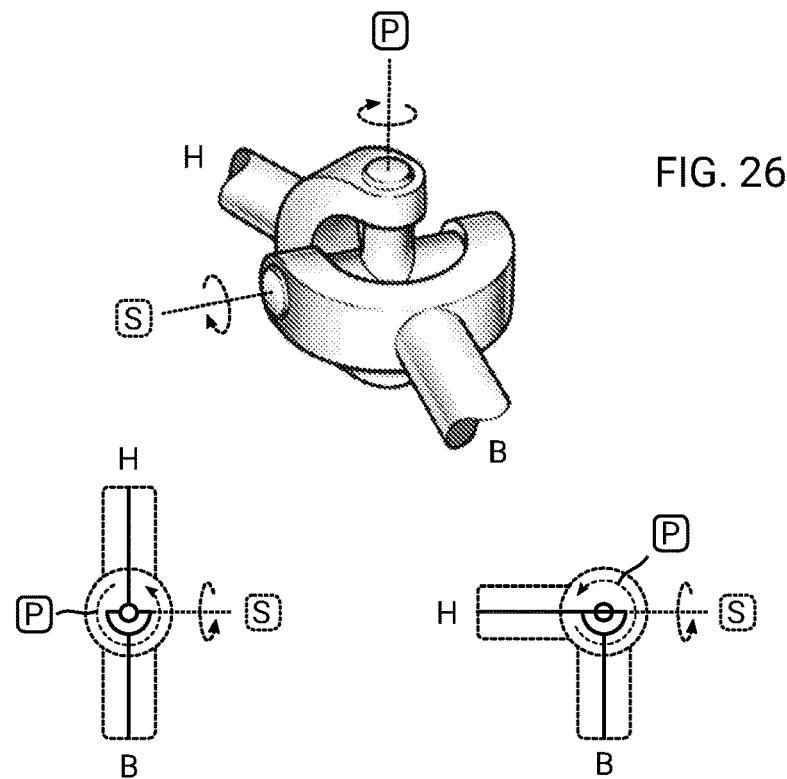
FIG. 26
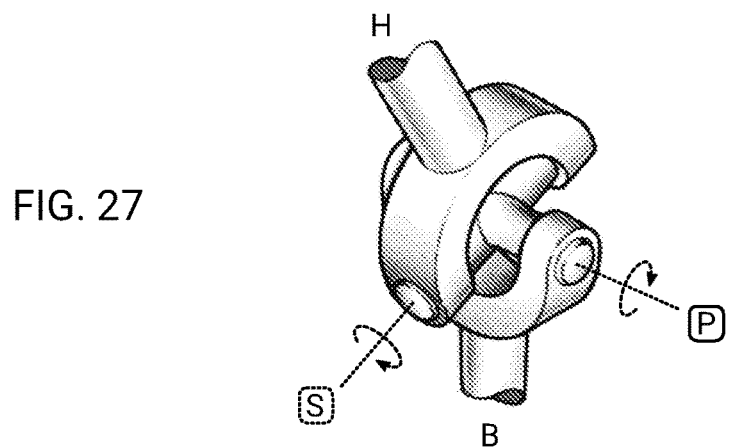
FIG. 27
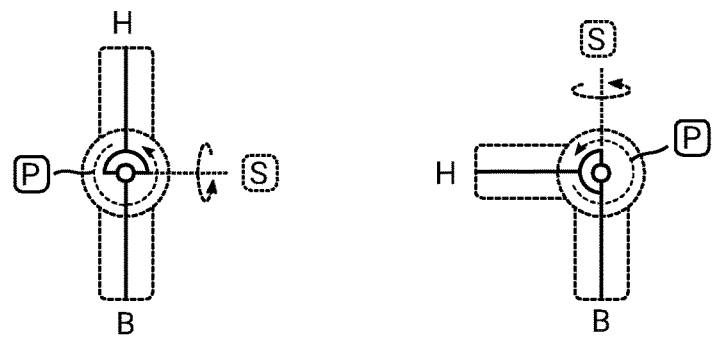

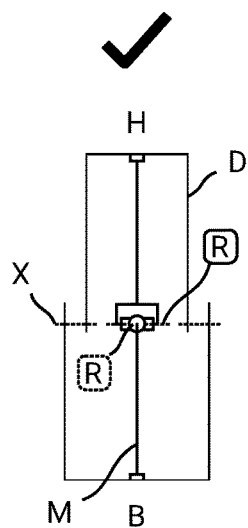
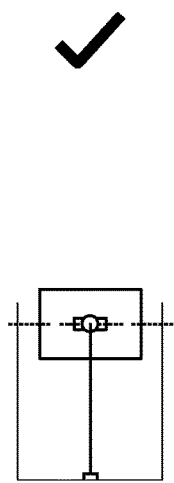
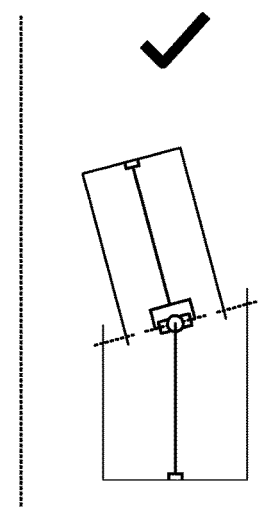
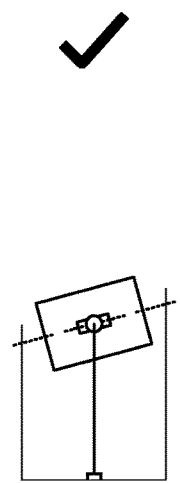
FIG. 37A  FIG. 37B  FIG. 37C  FIG. 37D
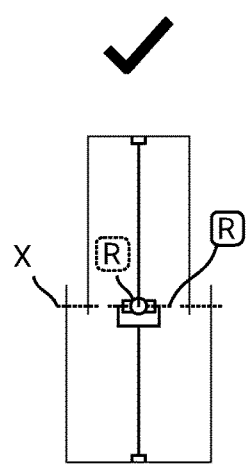
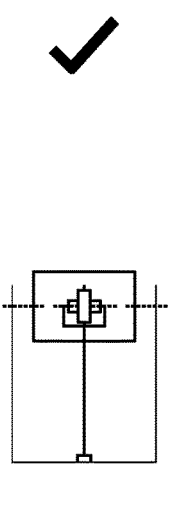
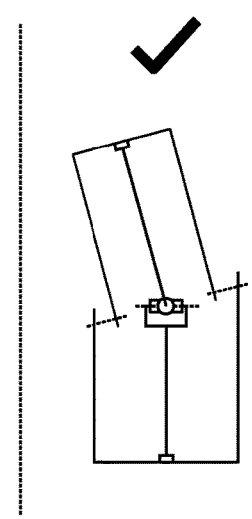
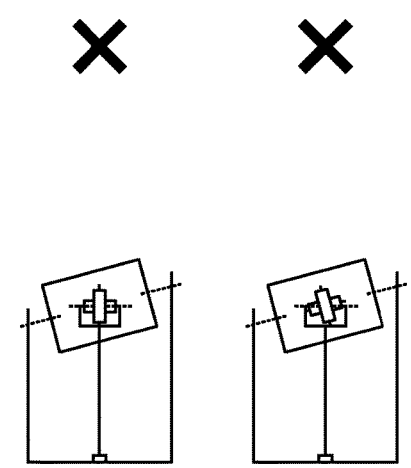
FIG. 38A  FIG. 38B  FIG. 38C  FIG. 38D  FIG. 38E

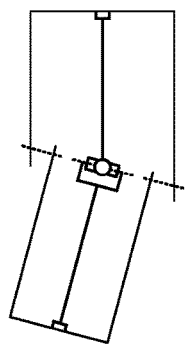 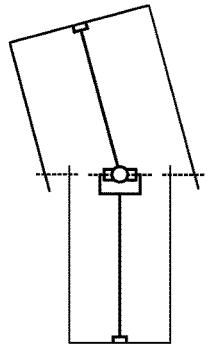 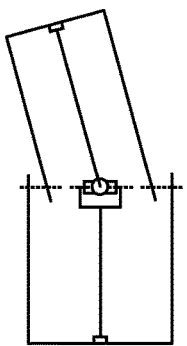  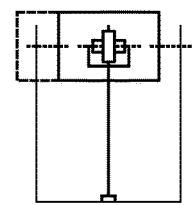
FIG. 39A  FIG. 39B  FIG. 39C  FIG. 39D
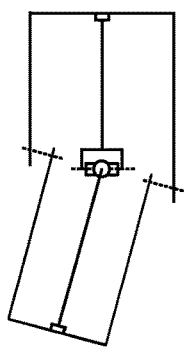 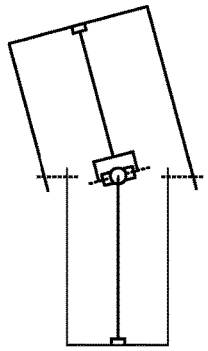 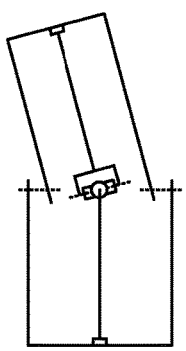  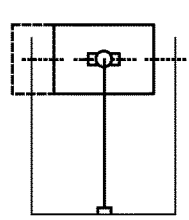  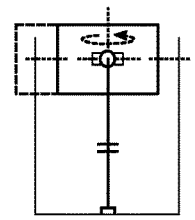
FIG. 40A  FIG. 40B  FIG. 40C  FIG. 40D  FIG. 40E

COORDINATE POSITIONING ARM

The present invention relates to a coordinate positioning arm, such as an articulated robot or a measurement arm.

Articulated robots are commonly used in a wide variety of manufacturing applications such as assembly, welding, gluing, painting, picking and placing (e.g. for printed circuit boards), packaging and labeling, palletizing, and product inspection. They benefit from being versatile and rugged, with a large reach and a high degree of flexibility of movement, making them ideal for use in a production environment.

An articulated robot (or just "robot" for short) is illustrated schematically in FIG. 1 of the accompanying drawings, comprising an articulated robot arm 1 extending from a fixed base 2 to a movable flange 3, with the flange 3 supporting a tool (or end effector) 4. Typically, the flange 3 is provided with a coupling which allows for the tool 4 to be conveniently interchangeable, so that a variety of tools or end effectors can be employed depending on the application concerned; examples include grippers, vacuum cups, cutting tools (including both mechanical and laser cutting tools), drilling tools, milling tools, deburring tools, welding tools and other specialized tools.

The arm 1 comprises a plurality of segments 5 connected by a mixture of transverse rotary joints 6 and inline rotary joints 7, forming a mechanical linkage from one end to the other. In the example illustrated in FIG. 1, there are three transverse rotary joints 6 and three inline rotary joints 7, making a total of six rotary joints, alternating between transverse rotary joints 6 and inline rotary joints 7. In the context of a robot arm, a transverse rotary joint 6 is sometimes referred to as a "rotational joint" and an inline rotary joint 7 is sometimes referred to as a "twisting joint", with other types of joint being a "linear joint", "orthogonal joint" and "revolving joint".

Perhaps the most common arrangement for an industrial robot is to have six rotary joints, though a robot may also have one or more linear joints. Having multiple joints allows for flexibility in moving the tool 4 around a working volume and manipulating it into a variety of different poses. The degree of flexibility can be altered by having more or fewer joints in the arm.

Having additional joints (and therefore additional flexibility) has a downside in that each joint contributes a positional error or uncertainty, and because of the serial nature of the linkages these errors are cumulative. It is important to calibrate the robot in order to map out these errors or uncertainties.

However, calibration of any type of non-Cartesian machine is a significant challenge, and particularly so for an articulated arm such as that illustrated in FIG. 1 having a plurality of rotary joints that are not fixed relative to one another and that can combine in complicated ways to position the tool in the working volume. Calibration of a Cartesian machine is typically more straightforward, because such a machine has three well-defined axes that are fixed relative to one another in an orthogonal arrangement, with each axis being largely independent of another. With an articulated robot, the position and orientation of each axis depends on the position and orientation of each other axis, so that the calibration will be different for each different machine pose.

Many calibration techniques have in common the goal of specifying a parametric model of the machine concerned, in which a plurality of parameters are used to characterise the machine's geometry. Uncalibrated values are initially assigned to these parameters as a starting point for the machine geometry. During the calibration, the machine is moved into a variety of different poses (based on the current estimates of the machine parameters). For each pose, a calibrated measuring device is used to measure the actual pose, so that an indication of the error between the assumed machine pose and the actual machine pose can be determined.

The task of calibrating the machine then amounts to determining a set of values for the machine various parameters that minimises the errors, using known numerical optimisation or error minimisation techniques. An example of such a technique is the well-known Levenberg-Marquardt algorithm, which uses a least-squares approach to minimise errors knowing the derivatives of the errors according to each parameter optimised ("A Method for the Solution of Certain Non-Linear Problems in Least Squares", Kenneth Levenberg, 1944, Quarterly of Applied Mathematics, 2: 164-168; and "An Algorithm for Least-Squares Estimation of Nonlinear Parameters", Donald Marquardt, 1963, SIAM Journal on Applied Mathematics, 11 (2): 431-441). Other techniques are also possible, including those based on a maximum likelihood approach.

For a robot as illustrated in FIG. 1, these machine parameters might include various geometrical parameters such as the length of each of the segments 5 and the rotation angle offset of each of the rotational joints 6, 7 (with the angle from the encoder plus the calibrated offset giving the actual angle), as well as various mechanical parameters such as joint compliance and friction. When properly calibrated, with all of these machine parameters known, it is possible to predict with more certainty in what position the tool 4 will actually be when the various joints 6, 7 are commanded by a robot controller 8 to move to different respective positions. In other words, the machine parameters resulting from such a calibration provide a more accurate characterisation of the machine geometry.

However, even after calibration of such an articulated robot, errors will remain, and because of the serial nature of the mechanical linkage, these errors are cumulative. As a result, the accuracy and repeatability of an articulated robot is typically not as good as that of a traditional three-axis Cartesian machine, for example. Therefore, although articulated robots benefit greatly from a large reach and a high degree of flexibility and versatility, they are not typically suitable for use in the most demanding of applications where high accuracy and/or repeatability is required.

The present applicant has appreciated the desirability of addressing the above-described shortcomings, to provide a coordinate positioning arm which can benefit from the reach and flexibility of an articulated robot, but which also has an improved accuracy and/or repeatability.

The present applicant has also appreciated the desirability of providing a coordinate measuring arm which is adapted primarily for measurement applications rather than manufacturing applications, where accuracy is of paramount importance. Such a coordinate measuring arm (or just measurement arm) would ideally have sufficient accuracy to be used in applications where otherwise a more traditional coordinate measuring machine (e.g. a three-axis Cartesian coordinate measuring machine) would have to be used, and yet would benefit from the reach and flexibility of a non-Cartesian articulating extendible arm arrangement.

According to an aspect of the present invention there is provided a coordinate positioning arm comprising: a base end and a head end; a drive frame for moving the head end relative to the base end; and a metrology frame for measuring a position and orientation of the head end relative to the base end. The drive frame comprises a plurality of drive axes arranged in series between the base and head ends. The metrology frame comprises a plurality of metrology axes arranged in series between the base and head ends. Advantageously, the metrology frame is (substantially) separate and/or independent from the drive frame.

The substantial separation and/or independence between the metrology and drive frames may be achieved by providing the coordinate positioning arm with one or more of the following features.

The metrology frame may be supported by and/or coupled to the drive frame substantially only at (or via) the base and head ends. This avoids the presence of intermediate supports or constraints between the metrology and drive frames (at locations between the base and head ends) and thereby enables the separation between the metrology and drive frames to be maintained.

For each possible configuration of the drive frame, the metrology axes may provide the metrology frame with sufficient degrees of freedom to avoid creating an additional constraint for the drive frame between the base and head ends (other than what is already provided by the drive axes themselves, since the drive axes can be considered to act as constraints to relative motion between the base and head ends). When an additional constraint is created by the presence of the metrology frame this undermines the separation between the metrology and drive frames.

For each possible configuration of the drive frame, the metrology axes may provide the metrology frame with sufficient degrees of freedom to avoid creating over constraint between the metrology and drive frames. When there are more constraints than necessary between the metrology and drive frames (i.e. over constraint) this undermines the separation between the metrology and drive frames.

The metrology axes may be arranged to provide the metrology frame with insufficient degrees of freedom to enable more than one configuration for the metrology frame for each configuration of the drive frame. In other words, the metrology and drive axes may be mutually arranged to provide only one possible configuration for the metrology frame for each configuration of the drive frame. In other words, for each possible configuration of the drive frame, there is preferably only one possible configuration for the metrology frame. This avoids the need for intermediate supports or constraints between the metrology and drive frames, to force or guide the metrology frame into the correct one of several possible configurations, and thereby enables the separation between the metrology and drive frames to be maintained.

The metrology axes of the metrology frame may be arranged such that, for each possible configuration of the drive frame, there is no redundancy in the metrology axes (for example in terms of enabling and measuring relative movement between the head and base ends in all required degrees of freedom). Stated another way, the metrology and drive axes may be arranged such that there is no configuration for the drive frame in which two metrology axes of the metrology frame become aligned. This prevents the effective loss of degrees of freedom in the metrology frame, which would create additional constraint between the metrology and drive frames and thereby diminish or undermine the separation and/or independence between them.

For each drive axis that has both an associated primary metrology axis (for measuring primary or intended movement associated with the drive axis) and an associated secondary metrology axis (for measuring secondary or unintended movement associated with the drive axis), the secondary metrology axis may be arranged before the primary metrology axis (in series order from the base end to the head end). This helps to prevent redundancy in the metrology axes, for which see above.

The drive frame may comprise no more than three drive axes, and the metrology frame may comprise no more than six metrology axes. For example. the drive frame may comprise three drive axes, and the metrology frame may comprise six metrology axes. Having a relatively small number of drive axes and associated metrology axes facilitates the separation between the drive and metrology frames, as will be explained in more detail below.

When it is stated that the metrology frame is substantially separate and/or independent from the drive frame (or that the metrology and drive frames are mutually arranged and adapted to be substantially separate and/or independent from one another), this does not imply that the metrology frame will not react to changes in the configuration of the drive frame. As stated above, the drive frame is adapted and arranged to move the head end relative to the base end, and in turn the metrology frame is adapted and arranged to measure a position and orientation of the head end relative to the base end. The base and head ends can be considered to to be neither part of the metrology frame as such nor part of the drive frame as such. Therefore, the metrology frame can be coupled to the drive frame via the base and head ends (so that when the drive frame causes the head end to move relative to the base end this also causes the metrology frame to change configuration, with measurements from the metrology axes being used to determine the position and orientation of the head end relative to the base end), and yet the metrology frame itself can still be considered to be substantially separate and/or independent from the drive frame itself.

Other features are described below which also help to maintain separation and/or independence between the metrology frame and the drive frame. The technical benefits of doing so, relative to known articulated robot arms, will also now be explained in more detail.

In order to address the above-mentioned shortcomings with previously-considered articulated robot arms, and in order to provide a coordinate positioning arm which can benefit from the reach and flexibility of an articulated robot arm, but which also has an improved accuracy and/or repeatability, the present applicant has appreciated the importance of avoiding movements (e.g. flexing or twisting movements) of or within the metrology frame that are not enabled by any combination of one or more of the metrology axes. Such movements of the metrology frame would not be measured, because it is only the metrology axes themselves that are in practice encoded (measured). If the metrology frame and drive frame could be manufactured and coupled together in perfect alignment, and remain so during use, then it would be sufficient just to ensure that a metrology axis is provided for (and aligned with) each drive axis, so that movement associated with each drive axis can be measured. These measurements effectively provide a set of machine coordinates, from which the position and orientation of the head end relative to the base end can be determined.

However, the present applicant has appreciated that, in practice, there are imperfections in the manufacturing process, and that in use the machine parts will tend to drift out of alignment over time. In addition, each drive joint will inevitably have a natural degree of play associated with it, so that along with the primary rotation around the primary drive axis there will inevitably be some secondary (unwanted) rotation around orthogonal axes. Furthermore, each of the segments of the drive frame and metrology frame will have a nominal (ideal) length but in practice the actual length may be differ from the ideal length, and is likely to change with operating temperature due to thermal expansion and contraction.

In particular, the present applicant has appreciated that these non-ideal behaviours will have a tendency to create over constraint between the metrology and drive frames, where the metrology frame tends to "fight" against the drive frame, with the drive frame trying to put the metrology frame into a configuration which is incompatible with the available metrology axes of the metrology frame. This in turn will lead to distortions of the metrology frame that are not measured, which in turn means that the metrology results (and ultimately the measure of the position and orientation of the head end relative to the base end) will be adversely affected.

The present applicant has appreciated that it is desirable to avoid creating unnecessary constraints between the drive and metrology frames, particularly at intermediate locations between the head and base ends of the arm, as is the case in US20050166413A1 where multiple transmission means are provided along the length of the arm in order to support the inner measuring structure. These transmission means create constraints between the inner measuring structure and the exoskeleton which an embodiment of the present invention seeks to avoid by having a metrology frame that is substantially separate and/or independent from the drive frame. This is also the case for the arm structure disclosed in U.S. Pat. No. 4,606,696, in which the internal measuring beams must be supported at intermediate locations between the base and the head end. Furthermore, with the arm disclosed in US20050166413A1 each drive axis is provided with a single corresponding measurement axis, which (as will be apparent from the appended drawings and from the description below) is insufficient to prevent over constraint between the inner measuring structure and the exoskeleton, particularly where a joint is at 90 degrees. An embodiment of the present invention seeks to avoid this.

By adopting one or more of more of the features set out above or below in relation to an aspect of the present invention, a coordinate positioning arm can be produced that is optimised for accuracy, and which is sufficiently accurate to be used for example as a coordinate measuring machine in demanding measuring applications, whilst also benefitting from the flexibility and reach of a traditional robot arm. Ensuring a separation between the metrology and drive frames also enables the drive frame to be constructed at a lower cost than normal, for example not requiring as much stiffness to be designed into the various joints, because the separate metrology frame provides a direct measurement of the head end relative to the base end and is not subject to any inaccuracies or imperfections in the drive frame.

And since the metrology axes of the coordinate positioning arm are in a series arrangement, by ensuring that any secondary metrology axis associated with a drive axis is arranged before the corresponding primary metrology axis for that drive axis (in series order from the base end to head end), when the head end of the arm rotates around the drive axis this ensures that the orientation of the secondary metrology axis does not change (since it comes before the primary metrology axis around which the head end of the metrology frame will rotate). This in turn ensures that the secondary metrology axis does not, as a result of such a change in the configuration of the drive frame, become aligned with another metrology axis, thereby leading to the effective loss of a metrology axis and the likely creation of undesirable constraint between the metrology and drive frames (and consequent unmeasured flexing of the metrology frame). This concept will be discussed further below, along with other advantageous features that can further be used to enhance the performance and accuracy of a coordinate positioning arm.

The metrology frame may comprise a plurality of metrology joints, with each metrology joint comprising at least one of the metrology axes of the metrology frame. At least one transverse metrology joint (corresponding to a transverse drive joint) may comprise metrology axes that provide primary and secondary rotational degrees of freedom (for the metrology joint), with the primary rotational degree of freedom being substantially aligned with the corresponding transverse drive axis (i.e. the drive axis of the corresponding drive joint) and being arranged after the secondary rotational degree of freedom in series (in order from base end to head end).

Such a metrology joint is advantageous because it provides two rotational degrees of freedom, with one being for measuring primary rotation associated with of the drive axis (i.e. intended rotation) and with the other being for measuring secondary rotation associated with the drive axis (i.e. unintended rotation). Furthermore, due to the particular series ordering of these two degrees of freedom within the metrology frame, the orientation of the secondary axis (relative to the metrology frame below it) is maintained even as the metrology frame above rotates around the primary axis. This helps to ensure that metrology axes do not become aligned at any time during use of the arm. When metrology axes become aligned this results in redundant metrology axes which leaves the metrology frame with insufficient degrees of freedom (or flexibility) to handle all possible motions (both intended and unintended) of the drive frame, and causes over constraint between the metrology frame and the drive frame. Such over constraint, as also mentioned above, leads to changes in the configuration of the metrology frame that do not register in the metrology results, resulting in an inaccurate determination of the position and orientation of the head end of the arm relative to the base end. An embodiment of the present invention seeks to avoid this.

The drive frame may comprise (exactly) three rotary drive axes arranged in series between the base and head ends, two of which are transverse and the other of which is inline. The metrology axes may provide (exactly) three primary rotational degrees of freedom for the metrology frame (associated respectively with the three drive axes), (exactly) two secondary rotational degrees of freedom for the metrology frame (associated respectively with the two transverse drive axes), and (exactly) one secondary linear degree of freedom for the metrology frame (not associated, at least directly, with any drive axis).

Having a relatively small number of rotary drive axes, compared to a typical articulated robot for example, greatly simplifies calibration of the coordinate positioning arm, and enables the arm to be optimised for accuracy. By having fewer drive axes, this also enables the metrology frame similarly to have fewer axes. Furthermore, by having fewer drive axes it becomes possible to have a metrology frame that is self-supporting, i.e. supported only at the base end and head ends without any intermediate support (or negligible intermediate support). In this respect, where an arm has for example seven rotary drive axes (which is common), there must be at least seven metrology axes in order to measure all seven of the drive axes. But having seven rotary metrology axes means that the metrology frame must be supported by the drive frame at intermediate positions, since otherwise the metrology frame would flip-flop between different possible configurations. Not only would that result in clashes between the metrology and drive frames, but even without clashing the present applicant has appreciated that it is problematic to have the multiple possible solutions for the metrology frame, for the same position of drive frame, because each of those metrology solutions would need to be calibrated, and it cannot be predicted in advance which of two possible metrology solutions will be adopted for any particular position of the drive frame. Accordingly, the present applicant has appreciated that there are many advantages associated with limiting the number of drive axes in the coordinate positioning arm; if further drive axes are required then it is possible to chain together several of these "core" units, with each unit, as well as the composite structure, having the benefit of the present invention.

The metrology axes may be (collectively) arranged to provide the metrology frame with one or more of the following features, preferably for each (or any) possible configuration of the drive frame, or at least a subset of the possible configurations of the drive frame, for example a subset comprising those configurations of the drive frame that are ordinarily or which might reasonably be used during normal use (including configurations of the drive frame in which at least some, for example all, transverse drive axes are at 180 degrees, and those in which at least some, for example all, transverse drive axes are at 90 degrees):

(a) sufficient degrees of freedom to avoid (creating) over constraint between the metrology and drive frames (for that configuration of the drive frame);

(b) sufficient degrees of freedom to avoid creating an additional constraint for the drive frame between the base and head ends (for that configuration of the drive frame, other than what is already provided by the drive axes themselves); and (c) insufficient degrees of freedom to provide (or allow or enable) more than one possible configuration for the metrology frame (i.e. there is a unique solution or configuration of the metrology frame for that configuration of the drive frame).

For each possible configuration of the drive frame there is preferably substantially no redundancy in the metrology axes of the metrology frame. In other words, each of the metrology axes is not (or does not become) aligned with any of, or a combination of any of, the other metrology axes. As such, there are no redundant metrology axes or there is no redundancy in the metrology axes. The metrology and drive axes are preferably arranged such that there is no configuration for the drive frame in which two or more rotary metrology axes of the metrology frame are aligned.

The metrology frame may be coupled to (or supported by or constrained relative to) the drive frame substantially only at the base and head ends. This avoids creating intermediate constraints between the base and head ends that would otherwise provide additional constraints for the drive frame between the base and head ends, and thereby avoids creating over constraint between the metrology and drive frames. This applies also to intermediate constraints that might in practice act substantially only whilst the arm is moving (i.e. dynamic rather than static constraints).

The metrology frame may comprise a plurality of metrology joints, with each metrology joint comprising at least one of the metrology axes of the metrology frame. Each drive axis may be provided (or associated) with a corresponding one of the metrology joints.

The at least one metrology axis of each metrology joint (corresponding to or associated with a drive axis) may provide a primary degree of freedom (for the metrology joint) that is substantially aligned with the corresponding drive axis (i.e. the drive axis of the corresponding drive joint).

At least one (preferably each) transverse metrology joint (i.e. a metrology joint corresponding to or associated with a transverse drive axis) preferably comprises metrology axes that provide primary and secondary rotational degrees of freedom (for the transverse metrology joint), with the primary rotational degree of freedom being substantially aligned with the corresponding drive axis (i.e. the drive axis of the corresponding drive joint).

The primary rotational degree of freedom (or primary rotary axis) may be arranged after the secondary rotational degree of freedom (or secondary rotary axis) in series (in a direction from the base end to the head end).

The orientation of the secondary rotational degree of freedom (or secondary rotary axis) may be substantially invariant to rotation (of the metrology frame) around the primary rotational degree of freedom (or primary rotary axis).

The orientation of the primary rotational degree of freedom (or primary rotary axis) may vary with rotation (of the metrology frame) around the secondary rotational degree of freedom (or secondary rotary axis).

The primary and secondary rotational degrees of may be provided respectively by primary and secondary rotary metrology axes.

The primary and secondary rotary metrology axes may substantially intersect (or may instead be offset from one another).

The primary and secondary rotary metrology axes may be provided by a universal joint, a Cardan joint, or a Hooke's joint.

The primary and secondary rotary metrology axes may be encoded respectively by first and second rotary encoders.

The secondary rotational degree of freedom (or secondary rotary axis) may be substantially orthogonal to the primary rotational degree of freedom (or primary rotary axis).

The secondary rotational degree of freedom (or secondary rotary axis) may be substantially orthogonal to a longitudinal axis of a segment of the metrology frame connected to the metrology joint from below (i.e. in a direction from the base end towards the metrology joint).

A segment may be referred to alternatively as a link or strut.

The primary rotational degree of freedom may be (adapted or provided) for measuring primary rotation and the secondary degree of freedom may be (adapted or provided) for measuring secondary rotation that is smaller than the primary rotation (e.g. by at least an order of magnitude).

For at least one transverse metrology joint, one or more metrology axes (in the series of metrology axes) that are arranged (in series) before that metrology joint (in a direction from the base end to the head end) may provide the metrology joint with a tertiary rotational degree of freedom.

At least one of the one or more metrology axes that provide the tertiary rotational degree of freedom may form part of another transverse metrology joint.

Each transverse metrology joint may be so provided with a tertiary rotational degree of freedom.

A segment of the metrology frame that moves around the primary rotational degree of freedom may always be within 45 degrees of either the secondary rotational degree of freedom or the tertiary rotational degree of freedom.

A segment of the metrology frame that moves around the primary rotational degree of freedom may be rotatable around its longitudinal axis for any rotation angle around the primary rotational degree of freedom, due to the secondary rotational degree of freedom or the tertiary rotational degree of freedom or a combination of these (depending on the rotation angle).

The metrology frame may comprise a further metrology joint not associated with or corresponding (at least directly) to any particular drive axis.

The further metrology joint may be arranged between two transverse rotary metrology joints.

The at least one further metrology joint may comprise one or more metrology axes that (collectively) provide a linear degree of freedom (for the metrology frame). The linear degree of freedom may be a secondary degree of freedom The one or more metrology axes of the further metrology joint may comprise a linear metrology axis.

The one or more metrology axes of the further metrology joint may comprise a combination of rotary metrology axes arranged to be substantially equivalent to a linear metrology axis (at least for small relative movements along the linear degree of freedom).

The linear degree of freedom may be provided by two (or at least two) rotary metrology axes.

It is noted that the linear degree of freedom does not imply that relative movement is constrained in a linear manner, but merely that relative movement is allowed in a linear manner (and with an associated encoder such relative movement in a linear manner would be measured).

A primary degree of freedom (or axis) of the metrology frame may be (adapted or provided) for measuring primary (or intended or ideal) movements of the drive frame and wherein a secondary (or tertiary) degree of freedom (or axis) of the metrology frame may be (adapted or provided) for measuring secondary (or unintended or non-ideal) movements of the drive frame that are smaller than the primary movements.

The secondary movements may be smaller than the primary movements by at least an order of magnitude.

The secondary movements may be smaller than the primary movements by at least ten orders of magnitude.

The secondary movements may be smaller than the primary movements by at least 100 orders of magnitude.

The coupling between the metrology and drive frames at the base and head ends may be located after the final drive axis of the series and before the first drive axis of the series.

The coupling between the metrology and drive frames at the base and head ends may be a rigid coupling.

The metrology frame may be coupled to the drive frame substantially only at the base end and the head end.

The head end may be adapted for receiving and carrying an operational tool (e.g. a gripper or a welding tool or a probe head or a measurement probe). For this purpose, the head end may comprise a coupling or coupling features adapted to couple with a corresponding coupling or coupling features provided on the operational tool. The operational tool may be considered to be one that is intended to be positioned by the coordinate positioning arm. In this respect it is not normally the intention for a coordinate positioning arm to exist in isolation merely to position the head end relative to the base end, without any other purpose, but rather it is normally the intention to attach some tool or other to the head end (to be positioned by the arm) so that the arm can perform a useful task using the tool.

A coordinate positioning arm embodying the present invention be considered to be a functional (or working or usable or unitary or independent) entity in its own right, and not merely an arbitrary section or part of a longer coordinate positioning arm (for example it is not merely an arbitrary three axes within an arm having seven axes). An arbitrary selection of axes from a longer arm cannot be considered to be functional as a coordinate positioning arm.

A coordinate positioning arm according to an embodiment of the present invention may be removably couplable to another structure without substantially affecting its function as a coordinate positioning arm. The arm can be considered to have an independent existence in its own right. It can be stated that the (metrology and drive frames of the) coordinate positioning arm has (or have) no other metrology or drive axes (arranged in series between the base and head ends) other than the plurality mentioned.

The head end may be removably couplable to (may have a coupling for removably coupling to) another structure, such as an operational tool (e.g. a gripper or a welding tool or a measurement probe), and the base end may be removably couplable (may have a coupling for removably coupling to) another structure, such as a fixed base of the machine.

It is also possible for two or more such coordinate positioning arms to be coupled together (for example with the base end of one arm being coupled to the head end of another arm) to form a longer, composite coordinate positioning arm; but even in such a case each arm is functionally independent from each other arm. It can be considered that a coordinate positioning arm in this context comprises all those joints or axes that would normally be calibrated as a group rather than separately from one another.

The term removably couplable can be considered to mean readily attachable to and detachable/separable from, in normal operational use of the arm or as part of a routine operation, other than during assembly or disassembly or manufacture of the arm. During the course of assembly or disassembly it cannot be said that the arm is yet fully functional.

Advantageously (for each configuration of the drive frame) the configuration of the metrology frame is determined (or determinable) (e.g. substantially only) by the configuration of the drive frame and by a coupling between the metrology and drive frames at the base and head ends (and preferably without intermediate constraints to force the metrology frame into a particular one of two or more different possible configurations).

The metrology frame may be coupled to the drive frame at the base end and the head end in a manner which has an effect on the measurement of the position and orientation of the head end relative to the base end.

The base end is not necessarily located at the actual base (or other such extremity) of the coordinate positioning arm. The base end may be spaced apart from a distal end of the coordinate positioning arm. The base end can be considered to comprise any part that comes before the first (drive and/or metrology) axis of the plurality. The (drive frame of the) coordinate positioning arm may have no drive axes arranged in series before the base end. The (metrology frame of the) coordinate positioning arm may have no metrology axes arranged in series before the base end. The base end can alternatively and/or equivalently be referred to as a base member.

The head end is not necessarily located at the actual head (or other such extremity) of the coordinate positioning arm. The head end may be spaced apart from a distal end of the coordinate positioning arm. The head end can be considered to comprise any part that comes after the final (drive and/or metrology) axis of the plurality. The coordinate positioning arm may have no drive and/or metrology axes after the head end in series. The (drive frame of the) coordinate positioning arm may have no drive axes arranged in series after the head end. The (metrology frame of the) coordinate positioning arm may have no metrology axes arranged in series after the head end. The head end can alternatively and/or equivalently be referred to as a head member.

The (metrology frame of the) coordinate positioning arm may have no metrology axes (arranged in series between the base and head ends) other than the plurality mentioned. In other words, the coordinate positioning arm may have no metrology axes arranged in series after the metrology axis of the plurality that is closest to the head end or before the metrology axis of the plurality that is closest to the base end. The (drive frame of the) coordinate positioning arm may have no drive axes (arranged in series between the base and head ends) other than the plurality mentioned. In other words, the coordinate positioning arm may have no drive axes arranged in series after the drive axis of the plurality that is closest to the head end or before the drive axis of the plurality that is closest to the base end.

The plurality of axes can be considered to include any axes that correspond to joints or parts of the arm that are normally calibrated together when calibrating the coordinate positioning arm.

The drive frame may comprise (e.g. only) rotary drive axes.

The drive frame may comprise no more than three rotary drive axes.

The drive frame may comprise exactly three rotary drive axes.

The drive frame may comprise two transverse rotary drive axes and one inline rotary drive axis.

Consider an example drive frame that comprises three rotary drive axes, two of which are transverse and the other of which is inline. With such a drive frame, the metrology frame may comprise metrology axes that provide three primary rotational degrees of freedom (associated respectively with the three drive axes), two secondary rotational degrees of freedom (associated respectively with the two transverse drive axes), and one secondary linear degree of freedom (not associated, at least directly, with any drive axis).

The inline rotary drive axis may be arranged before the transverse rotary drive axes (in series order from base end to head end).

Each drive axis may provide relative rotary motion between two connected segments of the drive frame (as part of a drive joint).

The degrees of freedom (provided by the metrology axes) may comprise a plurality that are (and which remain) substantially coincident (or aligned) respectively with the plurality of drive axes (e.g. for each possible configuration of the drive frame), for measuring movement associated with the drive axes.

The metrology and drive axes may be arranged such that there is no configuration for the drive frame (or at least no configuration which might reasonably be adopted in normal use of the coordinate positioning arm) in which two (rotary) metrology axes of the metrology frame are (or become) aligned. At least in this context, two (rotary) axes can be considered to be aligned when they are arranged substantially along the same line (or are substantially coincident or co-linear) rather than merely parallel to one another. At least in this context, where a linear metrology axis is provided by a combination of rotary axes, the rotary axes making up the linear metrology axis are not considered as being rotary metrology axes (but rather rotary axes making up a linear metrology axis).

The metrology frame may be housed or located or fitted substantially (or primarily) inside (or is substantially or primarily enclosed by) the drive frame.

The metrology axes may be encoded using encoders.

The metrology axes may be encoded using absolute encoders.

The metrology frame may be for measuring (arranged and/or adapted to measure) a position and orientation of the head end relative to the base end in six degrees of freedom.

The metrology axes of the plurality may be sufficient in number to measure a position and orientation of the head end relative to the base end in six degrees of freedom.

The metrology axes of the plurality may be arranged and/or adapted to measure a position and orientation of the head end relative to the base end in six degrees of freedom.

A metrology axis can be considered to be an axis of the metrology frame that contributes (in a meaningful or substantive way) to the measurement of the position and orientation of the head end relative to the base end.

The metrology frame may comprise six (or no more than six) metrology axes.

The drive frame may comprise three (or no more than three) drive axes.

The metrology frame may comprise a number of metrology axes equal to (or no more than) the number of degrees of freedom in which the metrology frame is adapted to measure a position and orientation of the head end relative to the base end.

The metrology frame may touch the drive frame substantially only at the head end and the base end.

The configuration of the metrology frame may be affected or influenced substantially only by a coupling between the drive frame and the metrology frame at the head end and by a coupling between the drive frame and the metrology frame at the base end.

An operational tool may be couplable (or coupled) to the head end.

The metrology frame may have only one solution (or configuration) for each configuration of the drive frame. The metrology frame may have only one solution for each position of the head end relative to the base end. The drive frame may also have only one solution for each position of the head end relative to the base end. By ensuring that there is just a single metrology configuration for each drive configuration, for any position of the head end relative to the base end, no intermediate constraint is required (between the head and base ends) in order to encourage the metrology frame into the right configuration or to hold the metrology frame in the right configuration; instead, the metrology configuration naturally follows from (is determined by) the drive configuration as the arm is moved around, in a predictable manner. This enables the metrology frame to be completely or substantially unsupported except at the base and head ends.

The coordinate positioning arm may be a coordinate measuring arm.

A surface sensing device (e.g. measurement probe) may be coupled to the head end. Any type of coordinate measuring device can be coupled to the head end to make the coordinate positioning arm act as a coordinate measuring arm. The sensing device may be contact or non-contact. Examples include touch trigger probes, scanning probes and optical probes. The surface sensing device may be coupled to the head end via a (pre-calibrated) probe head, so that the probe head itself is coupled to the head end, with the surface sensing device coupled to the probe head. The probe head may be a two-axis or three-axis probe head.

There are preferably no unmeasured drive axes or drive degrees of freedom between the head end and the surface sensing device.

A transverse rotary joint between two segments can be considered to be a rotary joint having a rotational axis that is transverse to (or perpendicular to) the respective longitudinal axes of both connected segments. With a transverse rotary joint, the segments (or their respective longitudinal axes) can vary in orientation relative to one another, with one being able to assume an orientation that is transverse to the other. A joint can be considered to have an input (e.g. drive) segment and an output (e.g. driven) segment. With a transverse rotary joint, the input and output segments are relatively rotatable about the transverse (perpendicular) rotary axis of the joint.

An inline rotary joint between two segments can be considered to be a rotary joint having a rotational axis that is in-line with (or parallel to or co-axial with) the respective longitudinal axes of both connected segments. With an inline rotary joint, the segments are and remain co-axial with one another. A joint can be considered to have an input (e.g. drive) segment and an output (e.g. driven) segment, and with an in-line rotary joint 7 the input and output segments to the joint are axially aligned and relatively rotatable about their common axis. An inline rotary joint can also be referred to as an axial or co-axial rotary joint.

The metrology axes may be considered to be separate and/or independent from the drive axes, and in particular are not coupled to the drive axes. The metrology and drive frames may be substantially separate and/or mechanically isolated from another except at the base and head ends. The metrology frame may be coupled to the drive frame substantially only at the base and head ends. The metrology frame may be substantially unsupported by the drive frame except at the base and head ends.

In this respect, it is preferable that a majority of the weight of the metrology frame is supported at the base and head ends, with the remainder (a minority) of the weight being supported at points intermediate between the base and head ends. How this support is distributed between the base and head ends will depend on the particular configuration or pose adopted by the coordinate positioning arm, taking into account the relative orientation with respect to gravity. Preferably at least 80% of the weight of the metrology frame is supported at the base and head ends. Preferably at least 90% of the weight of the metrology frame is supported at the base and head ends. Preferably at least 95% of the weight of the metrology frame is supported at the base and head ends. Preferably at least 99% of the weight of the metrology frame is supported at the base and head ends. Preferably at least 99.9% of the weight of the metrology frame is supported at the base and head ends. Preferably all of the weight of the metrology frame is supported at the base and head ends. Since the weight supported by the base and head end (compared to the weight supported at any intermediate points between the base and head ends) will typically vary depending on the drive configuration (pose), the above conditions can be considered to apply: (a) to each possible drive configuration; (b) to the "worst case" drive configuration in which the most weight is supported at intermediate points and the least weight is supported by the base and head ends; or (c) to an average or some other similar measure across a representative plurality of drive configurations. Whether or not the relevant condition is met can easily be determined for any particular arm by measurement.

It is preferable that a measure of the coupling strength or force (either static or dynamic) between the drive and metrology frames at any intermediate position(s) between the base and head ends is at least an order of magnitude (more preferably 5 orders of magnitude, more preferably 10 orders of magnitude, more preferably 100 orders of magnitude) smaller than the coupling strength or force required at the base and head ends.

It is preferable that the presence of (or alternatively the removal of) any intermediate support (between the base and head ends) has an insubstantial effect on a measurement or measurement signal from or associated with any or each of the metrology axes of the metrology frame and/or an insubstantial effect on a representative measured value for the position and orientation of the head end or a point on the head end relative to the base end (e.g. a position in x, y and z). By an insubstantial effect it is meant preferably no more than a 5% effect (or change), more preferably no more than 1%, more preferably no more than 0.5%, more preferably no more than 0.1%, more preferably no more than 0.01%, and more preferably no more than 0.001%. The effect can be easily determined by comparing the metrology signals from each metrology encoder (associated with each metrology axis) with and without the intermediate supports in place. Again, the above conditions can be considered to apply: (a) to each possible drive configuration; (b) to the "worst case" drive configuration; or (c) to an average or some other similar measure across a representative plurality of drive configurations.

It is to be understood that the descriptions herein of how the metrology frame and the drive frame are mutually adapted, in an embodiment of the present invention, to have certain desirable properties apply to a situation in which the coordinate positioning arm is in use and in which the metrology frame is active and providing operational measurements. In other words, the stated properties apply when the arm is in an active state with the metrology frame providing operational measurements of the head end relative to the base end. It is of course possible, when measurements are not being provided or not being used, for additional constraints to be in place between the metrology and drive frames because it does not then matter if the metrology frame is distorted and not providing true or accurate measurements of the position and orientation of the head end relative to the base end. Such a coordinate positioning arm, which has additional constraints in place only when not in operational or active use, would still be considered to fall within the scope of the present invention as set out in the appended claims. Likewise, the properties as set out in the appended claims need only apply to typical working configurations of the drive frame, for example in which an operational tool (e.g. measurement probe) coupled directly or indirectly to the head end is within a normal working volume of the machine, and need not apply to other configurations or poses for the arm that would not be used in practice.

The metrology and drive frames can be considered to be over constrained relative to one another where, for a particular configuration of the drive frame, the constraint between the metrology and drive frames (e.g. a rigid coupling at the base end and head end) tries to force the metrology frame into a configuration which it cannot reach (due to having insufficient degrees of freedom). This leads to a situation in which the metrology frame is "fighting" against the drive frame because the degrees of freedom available to the metrology frame are trying to put the metrology frame into a different configuration to the configuration into which the drive frame is attempting to force the metrology frame. This leads to the metrology frame experiencing stress, for example bending or twisting at locations in places where it should not. This in turn means that the metrology results will not provide a true representation of the position and orientation of the drive frame because the metrology frame is subject to movements (e.g. bending) that have not been measured (because there is no corresponding metrology axis where the unwanted bending occurs).

Alternatively, over constraint can be considered to have been avoided when the (presence of the) metrology frame provides substantially no (additional) constraint between the base end and the head end of the drive frame (other than what is already provided by the drive frame itself). In this respect, the head end is constrained relative to the base end by the drive frame, with the head end being constrained to move relative to the base end according to the degrees of freedom provided by the drive axes of the drive frame. In an embodiment of the present invention, the metrology frame does not create any additional constraint between the base end and the head end, so that the drive frame can move substantially as if the metrology frame were not present at all. For example, this would be the case if a piece of string were attached between the base and head end, because a piece of string has so many degrees of freedom available to it that it effectively creates no additional constraint by its presence.

Therefore, where it is stated or explained that the metrology axes provide the metrology frame with sufficient degrees of freedom to avoid (creating) over constraint between the metrology and drive frames, this can alternatively be read as the metrology axes providing the metrology frame with sufficient degrees of freedom to avoid creating an additional constraint (or to create or provide substantially no additional constraint) for the drive frame between the base end and head end (other than what is already provided by the drive axes of the drive frame).

The "head end" of the coordinate positioning arm can be considered to be any part that is beyond the final drive axis in the series of drive axes, i.e. any part driven via the final drive axis.

Similarly, the "base end" of the coordinate positioning arm can be considered to be any part that is before the first drive axis in the series of drive axes. In other words, the "end" of the coordinate positioning arm does not necessarily mean the very extreme end of the arm, with nothing beyond it, not least because the head end is likely to have an operational tool attached to it, which could also be considered to form part of the in-use arm. Where two or more such coordinate positioning arms are connected in series to form a composite arm, each component arm of the composite arm has a base end and a head end, as does the composite arm itself. When it is stated that the metrology frame is coupled to the drive frame substantially only at the base end and the head end, the coupling could be anywhere after the final drive axis (for the head end) and anywhere before the first drive axis (for the base end), noting that a drive axis is only considered to be a drive axis if it can have an effect on the position and orientation of the head end relative to the base end (i.e. it does not include a redundant axis situated after the head end or before the base end of the arm concerned, but there may be further arms connected in series as mentioned above). The terms "head end" and "base end" could alternatively be referred to as "first part" and "second part" respectively, or "head member" and "base member" respectively so as not to imply that they are located at the very head or base of the arm.

The drive frame can alternatively be referred to as a drive arrangement. The metrology frame can alternatively be referred to as a metrology arrangement.

The drive axes can be considered to act as constraints to relative motion between the base and head ends. When it is stated that a rotational degree of freedom is substantially aligned with another axis, it is meant that the rotational axis of the rotational degree of freedom is substantially aligned with that other axis. A transverse rotary metrology joint is one that corresponds to a transverse rotary drive axis.

A transverse rotary axis can be considered to be where the rotary axis is transverse to (usually orthogonal to) the segments connected by the rotary axis. An inline rotary axis can be considered to be where the rotary axis is substantially in line with the segments connected by the rotary axis.

A "configuration" of the drive frame can alternatively be referred to as a "pose" or "arrangement" or "state" of the drive frame. The configuration is defined or characterised by the state of each of the drive axes of the drive frame, i.e. the rotation angle of the drive frame (i.e. of the segments connected by the drive axis concerned) around each of the drive axes, including inline drive axes. The configuration of the drive frame can therefore be considered to comprise the set of rotation angles associated with the drive axes of the drive frame. The configuration of the drive frame can be likened to machine coordinates, which is a common concept in the context of coordinate measuring machines. The same considerations apply equivalently in respect of the "configuration" of the metrology frame.

The primary axes (or primary degrees of freedom) of the metrology frame are intended to measure the main or intended movements that are generally expected of the drive frame, i.e. those that arise from actuating or driving the drive axes. Inevitably, due to manufacturing tolerances and inaccuracies e.g. in axis alignment, and due to variations arising in operation e.g. because thermal expansion or contraction or mechanical loading, there will also be unintended or undesirable movements in the drive frame. The secondary axes (or secondary degree of freedom) of the metrology frame (whether they be rotary or a combination or rotary and linear) are intended to measure these unintended movements of the drive frame. The primary movements are typically at least an order of magnitude larger than the corresponding secondary movements, or even as much as ten orders of magnitude larger.

According to another aspect of the present invention, there is provided a coordinate positioning arm comprising: a base end and a head end; a drive frame for moving the head end relative to the base end; and a metrology frame for measuring a position and orientation of the head end relative to the base end; wherein the drive frame comprises a plurality of drive axes arranged in series between the base and head ends (which act as constraints to relative motion between the base and head ends); wherein the metrology frame comprises a (separate or independent) plurality of metrology axes arranged in series between the base and head ends; wherein the metrology frame is coupled to the drive frame at the base and head ends; wherein (for each possible configuration of the drive frame) the metrology axes (collectively) provide the metrology frame with sufficient (or the required) degrees of freedom to avoid (creating) over constraint between the metrology and drive frames (or to avoid creating an additional constraint for the drive frame between the base end and head end, e.g. other than what is already provided by the drive axes themselves); and wherein (for each possible configuration of the drive frame) the configuration of the metrology frame is determined (or determinable) (substantially only) by the configuration of the drive frame and by the coupling between the metrology and drive frames at the base and head ends (without intermediate constraints to force the metrology frame into a particular one of two or more different possible configurations).

According to another aspect of the present invention, there is provided a coordinate positioning arm comprising: a base end and a head end; a drive frame for moving the head end relative to the base end; and a metrology frame for measuring a position and orientation of the head end relative to the base end. The drive frame comprises a plurality of drive axes arranged in series between the base and head ends, and metrology frame comprises a plurality of metrology axes arranged (separately) in series between the base and head ends. The drive axes may be considered to act as (or provide) constraints to relative motion between the base and head ends. For each configuration (or pose or arrangement) of the drive frame, the metrology axes (collectively) provide (or are arranged to provide) the metrology frame with sufficient degrees of freedom to avoid (creating) over constraint between the metrology and drive frames. In other words, for each configuration (or pose or arrangement) of the drive frame, the metrology axes (collectively) provide (or are arranged to provide) the metrology frame with sufficient degrees of freedom to avoid (creating) an additional constraint for the drive frame between the base and head ends (other than what is already provided by the drive axes themselves).

According to another aspect of the present invention, there is provided a coordinate positioning arm comprising: a first part and a second part; a drive frame for moving the first part relative to the second part; and a metrology frame for measuring a position and orientation of the first part relative to the second part; wherein the drive frame comprises a plurality of drive axes arranged in series between the first and second parts; wherein the metrology frame comprises a (separate or independent) plurality of metrology axes arranged in series between the first and second parts; wherein the metrology axes (collectively) provide the metrology frame with sufficient (or the required) degrees of freedom to avoid (creating) over constraint between the metrology and drive frames; and wherein the configuration of the metrology frame is determined (or is determinable) by the configuration of the drive frame and by a coupling between the metrology and drive frames (substantially only) at the first and second parts.

According to another aspect of the present invention, there is provided a coordinate positioning arm comprising: a base end and a head end; a drive frame for moving the head end relative to the base end, comprising a plurality of drive axes arranged in series (where each drive axis contributes to the position and orientation of the head end relative to the base end); a metrology frame for measuring a position and orientation of the head end relative to the base end (in six degrees of freedom), comprising a plurality of metrology axes arranged in series (where each metrology axis contributes to the measurement of the position and orientation of the head end relative to the base end); and wherein the metrology frame is coupled to the drive frame (in a manner which would have an effect on the measurement of the position and orientation of the head end relative to the base end) substantially only at the base end and the head end; and wherein (for each possible configuration or pose or arrangement of the drive frame) the metrology axes (collectively) provide the metrology frame with degrees of freedom sufficient to avoid (creating) over constraint between the metrology and drive frames but insufficient to provide more than one possible configuration or pose or arrangement for the metrology frame.

According to another aspect of the present invention, there is provided a coordinate positioning arm comprising a drive frame having a plurality of rotary joints at least one of which is a transverse rotary joint and a separate metrology frame having a plurality of metrology joints corresponding respectively to the plurality of rotary joints, wherein the metrology joint corresponding to the transverse rotary joint has a major axis of rotation and a minor axis of rotation, orthogonal to one another, the major axis of rotation being substantially aligned with the axis of rotation of the transverse rotary joint and being for measuring rotation of the transverse rotary joint and the minor axis being for measuring inadvertent rotation of the transverse rotary joint, wherein the orientation of the minor axis is invariant to rotation around the major axis.

According to another aspect of the present invention, there is provided a coordinate positioning arm comprising: a base end and a head end; a drive frame for moving the head end relative to the base end; and a metrology frame for measuring a position and orientation of the head end relative to the base end; wherein the drive frame comprises a plurality of drive axes arranged in series between the base and head ends; and wherein the metrology frame comprises a plurality of metrology axes arranged in series between the base and head ends. Each drive axis has a corresponding primary metrology axis (for measuring primary or intended motion associated with that drive axis) and at least one (preferably each) (transverse) rotary drive axis (other than the first in series from the base end) also has at least one corresponding secondary metrology axis (for measuring secondary or unintended motion associated with that drive axis) wherein the or each secondary metrology axis is arranged before the corresponding primary metrology axis in series order from base end to head end (so that rotation of the head end around the drive axis does not affect the orientation of the or each secondary metrology axis, thereby avoiding redundancy in the metrology axes for certain configurations of the drive frame). The primary and the or each of the secondary metrology axes may be substantially orthogonal to one another. The primary and secondary metrology axes may substantially intersect. At least one of the secondary metrology axes may be formed by a combination of metrology axes. At least one of the secondary metrology axes may be formed by a primary metrology axis associated with another drive axis or by a combination comprising such a primary metrology axis.

According to another aspect of the present invention, there is provided a coordinate positioning arm comprising: a base end and a head end; a drive frame for moving the head end relative to the base end; and a metrology frame for measuring a position and orientation of the head end relative to the base end; wherein the drive frame comprises a plurality of drive axes arranged in series between the base and head ends; wherein the metrology frame comprises a plurality of metrology axes arranged in series between the base and head ends; wherein the metrology axes (collectively) provide each (transverse) rotary drive axis (other than the first) (or the associated drive joint) with three orthogonal rotational degrees of freedom (in the metrology frame) including a primary degree of freedom (the or each metrology axis for which corresponds to or is aligned with the drive axis) and two further degrees of freedom the metrology axes for which are arranged before the or each axis for the primary degree of freedom (in series order from base end to head end), and preferably the or each metrology axis for one of which is associated with a rotary drive axis further down in series (if any).

According to another aspect of the present invention, there is provided a coordinate positioning arm comprising: a base end and a head end; a drive arrangement for moving the head end relative to the base end; a metrology arrangement for measuring a position and orientation of the head end relative to the base end (in six degrees of freedom); wherein the drive arrangement comprises a plurality of drive axes arranged in series (with each drive axis contributing to the position and orientation of the head end relative to the base end); wherein the metrology arrangement comprises a plurality of metrology axes arranged in series (with each metrology axis contributing to the measurement of the position and orientation of the head end relative to the base end); wherein the metrology arrangement is coupled to the drive arrangement (in a manner which would affect the measurement of the position and orientation of the head end relative to the base end) substantially only at the base and head ends; wherein the metrology axes provide (the metrology arrangement with) degrees of freedom sufficient (in number and/or type and/or orientation) to avoid (creating) over constraint between the metrology and drive arrangements but insufficient (in number and/or type and/or orientation) to provide more than one possible configuration for the metrology arrangement for each configuration of the drive arrangement (without use of constraints between the metrology arrangement and drive arrangement between the base and head ends).

According to another aspect of the present invention, there is provided a coordinate positioning arm comprising: a drive arrangement for moving a head end of the arm relative to a base end of the arm; a metrology arrangement for measuring a position and orientation of the head end relative to the base end; wherein the drive arrangement comprises a plurality of rotary axes arranged in series between the head and base ends; wherein the metrology arrangement comprises a plurality of rotary axes arranged in series between the head and base ends; wherein for each drive axis there is an associated metrology axis each rotary metrology joint comprises first and second rotational metrology degrees of freedom and is provided with a third rotational metrology degree of freedom from one or more lower metrology joints in series (in a direction towards the base end), thereby providing three rotational degrees of freedom to the metrology arrangement connected above the joint (in a direction towards the head end); wherein the first rotary degree of freedom is a primary rotary degree of freedom for measuring the primary rotational degree of freedom of the corresponding drive joint, and wherein for any position of the first rotary degree of freedom the first, second and third rotary degrees of freedom remain mutually transverse to one another.

According to another aspect of the present invention, there is provided a coordinate positioning arm comprising: a drive arrangement comprising a plurality of rotary drive axes arranged in series between fixed and movable ends of the arm; and a metrology arrangement comprising a plurality of metrology axes for measuring the position and orientation of the movable end of the arm; wherein the metrology arrangement is coupled to the drive arrangement only at the fixed and movable ends (and in particular not at any of the rotary drive axes); wherein for each configuration of the drive arrangement there is only one possible configuration for the metrology arm; and wherein there is no over constraint between the metrology arrangement and the drive arrangement in any configuration.

According to another aspect of the present invention, there is provided a coordinate positioning machine comprising: a drive arrangement for positioning a movable structure within a working volume of the machine; a metrology arrangement for measuring a position (and/or orientation) of the movable structure within the working volume; wherein the drive arrangement comprises a plurality of rotary (drive) axes arranged in series; wherein the metrology arrangement comprises a corresponding plurality of rotary (metrology) axes arranged in series, for measuring primary (or intended) rotation (of the drive arrangement) around the corresponding respective rotary drive axes; wherein the drive arrangement and metrology arrangements are connected in parallel (separately and/or independently) between a fixed structure of the machine and the movable structure; wherein the metrology arrangement is arranged not to touch the drive arrangement other than via the movable structure at one end (of the series arrangement) and the fixed structure at the other end (of the series arrangement); and wherein for each configuration of the drive arrangement there is only one possible configuration of the metrology arrangement.

According to another aspect of the present invention, there is provided a coordinate positioning machine comprising: a drive arrangement for positioning a movable structure within a working volume of the machine; a separate (or independent) metrology arrangement for measuring a position (and/or orientation) of the movable structure within the working volume; wherein the drive arrangement comprises a plurality of rotary (drive) joints (arranged in series) each comprising a rotary drive axis; wherein the metrology arrangement comprises a corresponding plurality of rotary (metrology) joints (arranged in series) each comprising a (primary) rotary metrology axis for measuring primary (or intended) rotation (of the drive arrangement) around (the rotary drive axis of) the corresponding rotary drive joint; wherein each of at least two of the rotary metrology joints also comprises a secondary rotary metrology axis for measuring secondary (or unintended) rotation associated with the corresponding rotary drive joint, with the secondary rotary metrology axis being arranged in series (with and) before the primary metrology rotary axis (when viewed in a direction towards the movable structure).

According to another aspect of the present invention, there is provided a coordinate positioning machine comprising: a drive arrangement (connected between a fixed structure and a movable structure) comprising a plurality of rotary (drive) axes (arranged in series); and a separate (or independent) metrology arrangement comprising a corresponding plurality of rotary (metrology) axes (arranged in series), with each rotary metrology axis being (a primary rotary metrology axis) arranged to measure primary (or intended) rotation (of the drive arrangement) around the corresponding rotary drive axis; wherein each of at least two of the (primary) (transverse) rotary metrology axes is provided (or paired) with a secondary rotary metrology axis for measuring secondary (or unintended) rotation associated with the corresponding rotary drive axis, with the secondary rotary metrology axis being arranged in series (with and) before the (primary) rotary metrology axis (when viewed in a direction towards the movable structure).

According to another aspect of the present invention, there is provided a composite coordinate positioning arm comprising a plurality of coordinate positioning arms as set out herein.

According to another aspect of the present invention, there is provided a manufacturing or assembly method in which a coordinate positioning arm according to any preceding claim is used both to position one or more manufacturing or assembly tools for manufacturing or assembling an article and to position a measuring or inspection tool for measuring or inspecting the manufactured or assembled article. The measuring tool may be a coordinate measuring tool such as a touch trigger probe or scanning probe.

A machine controller for controlling the operation of the coordinate positioning arm is also provided in practice. The machine controller may be a dedicated electronic control system and/or may comprise a computer operating under control of a computer program. For example, the machine controller may comprise a real-time controller to provide low-level instructions to the coordinate positioning machine, and a PC to operate the real-time controller.

It will be appreciated that operation of the coordinate positioning machine can be controlled by a program operating on the machine, and in particular by a program operating on a coordinate positioning machine controller. Such a program can be stored on a computer-readable medium, or could, for example, be embodied in a signal such as a downloadable data signal provided from an Internet website.

Reference will now be made, by way of example, to the accompanying drawings, in which:

FIG. 1, discussed hereinbefore, is a schematic illustration of a coordinate positioning arm in the form of an articulated robot;

FIG. 2 illustrates a coordinate positioning arm similar to that shown in FIG. 1, but having only three rotary axes;

FIG. 3 illustrates how the three-axis coordinate positioning arm of FIG. 2 can be provided with additional degrees of freedom by coupling it with a separate two-axis (or three-axis) probe head;

FIG. 4 illustrates the operational versatility of a three-axis coordinate positioning arm coupled to a separate two-axis (or three-axis) probe head;

FIG. 5 illustrates the concept of providing the drive frame of a three-axis coordinate positioning arm with a separate internal metrology frame that is coupled to the drive frame only at the base and head ends of the arm;

Figure 8:
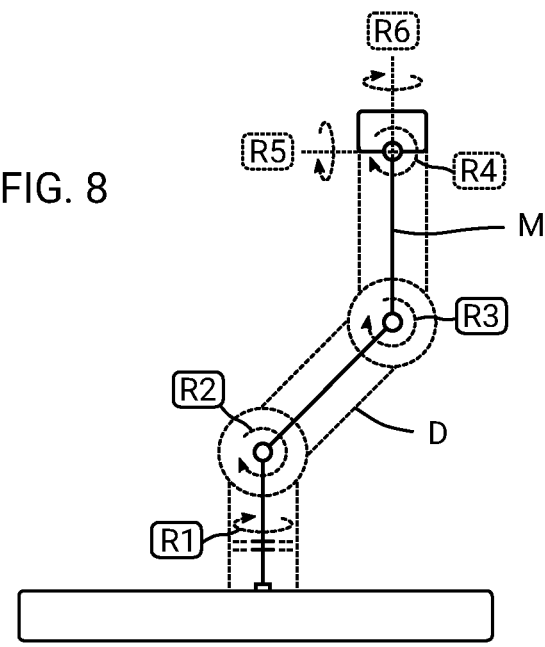
Figure 11:
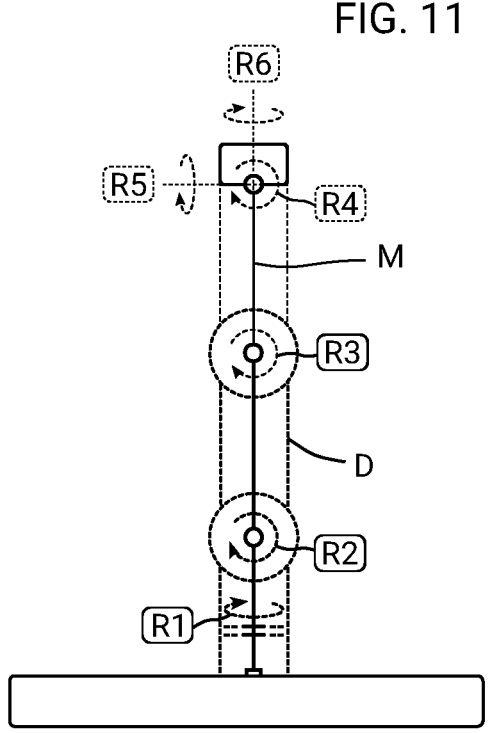
Figure 12:
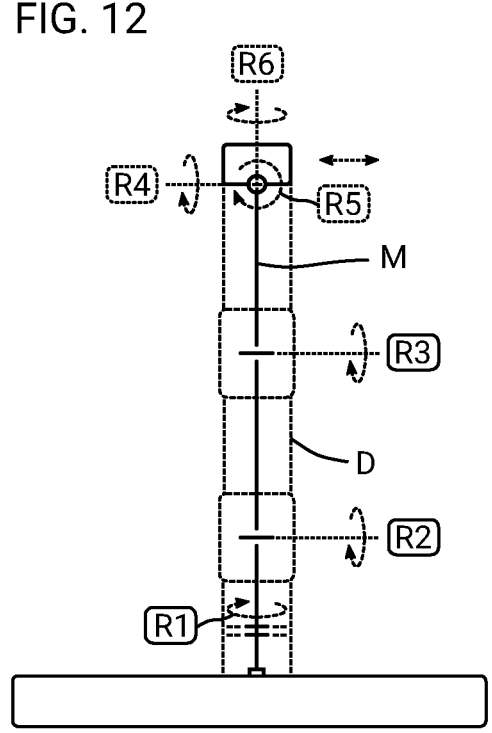
Figure 9:
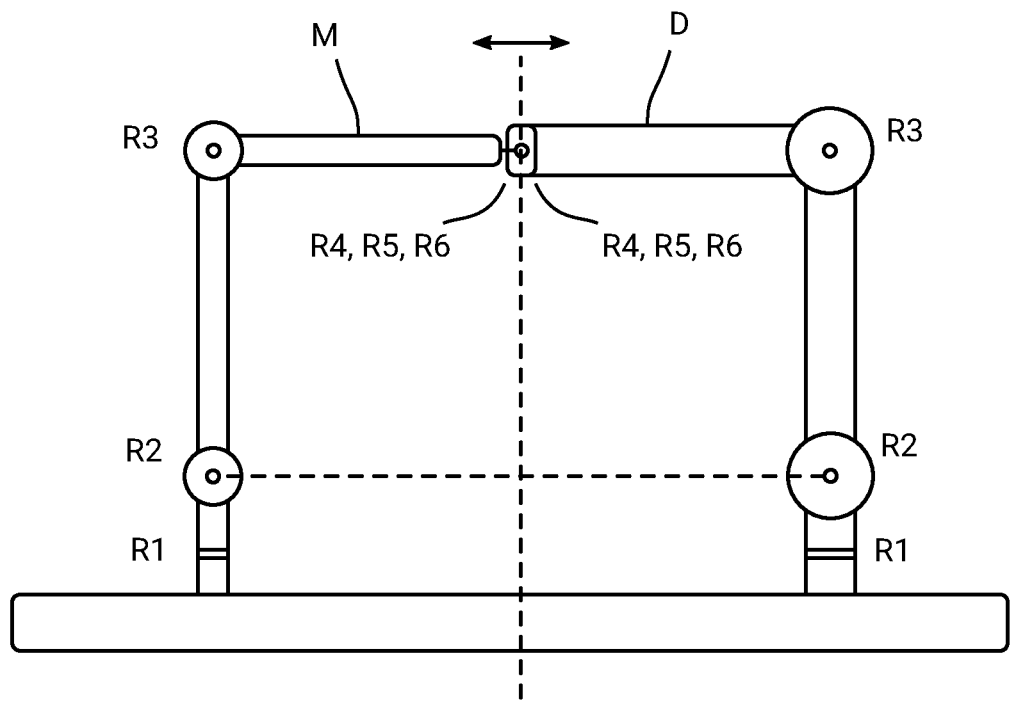
Figure 10:
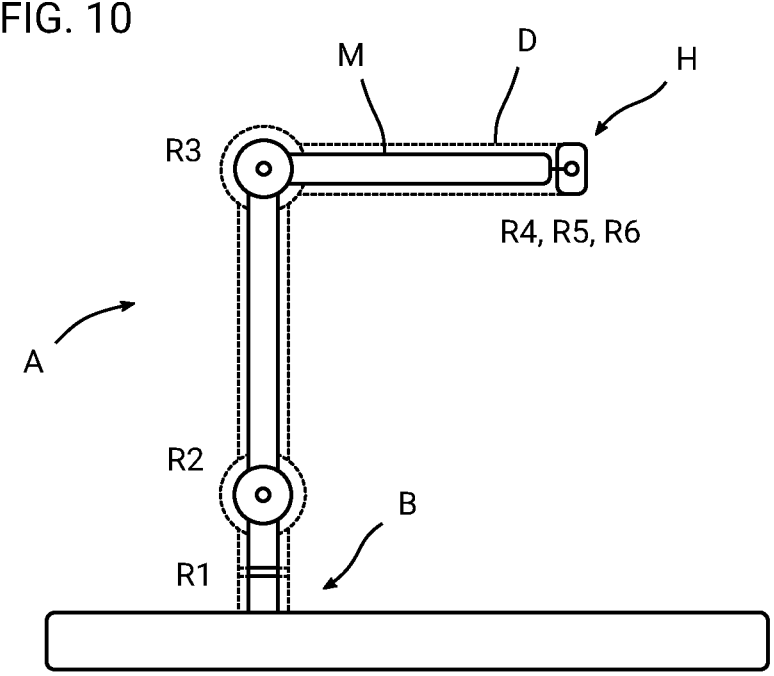
Figure 13:
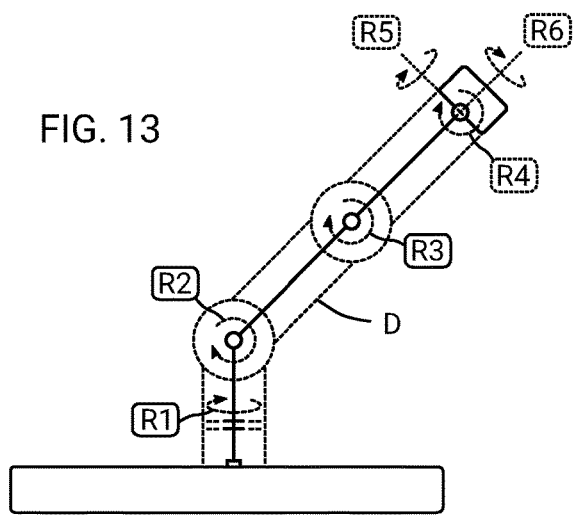
Figure 14:
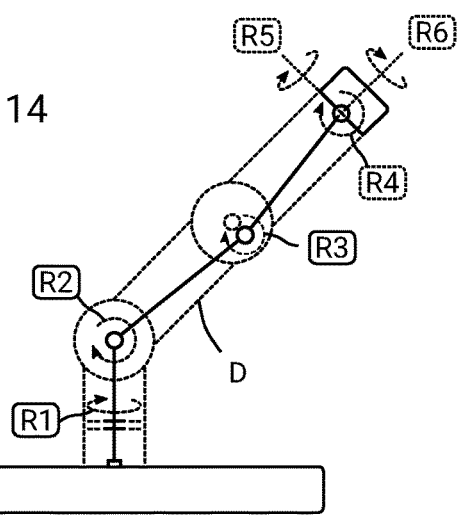
Figure 15A:
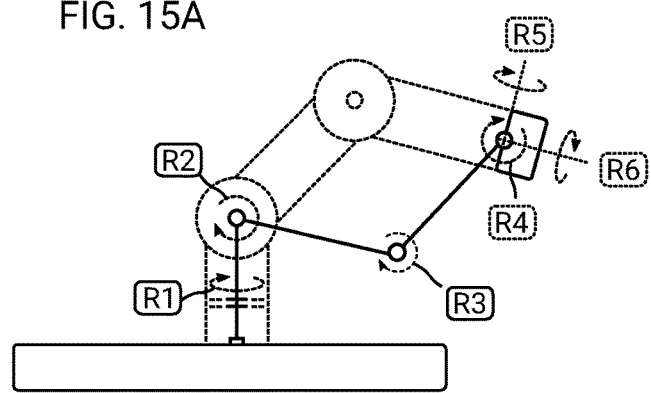
Figure 15B:
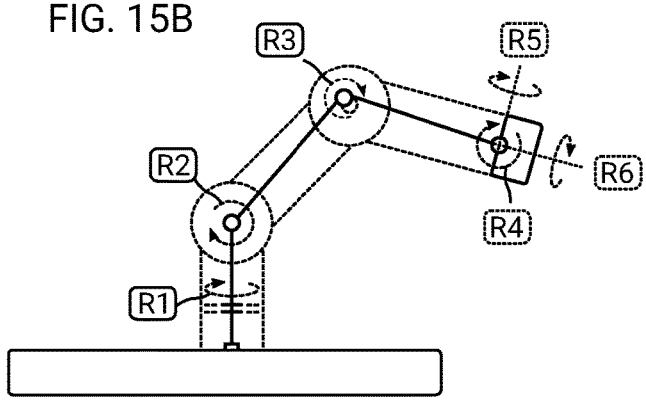
Figure 25:
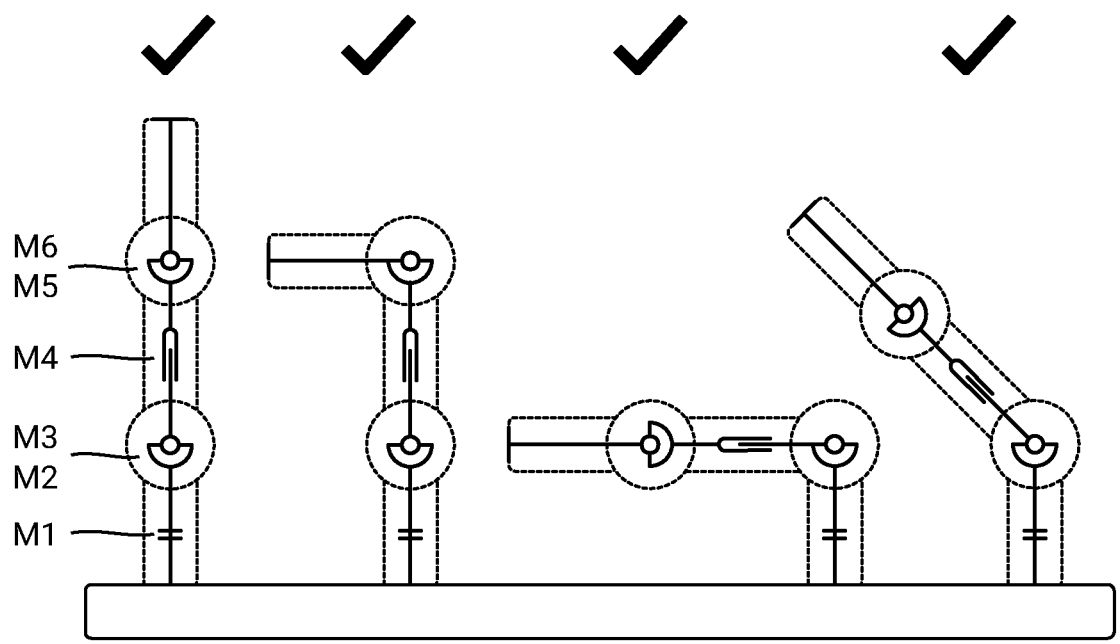
Figure 28:
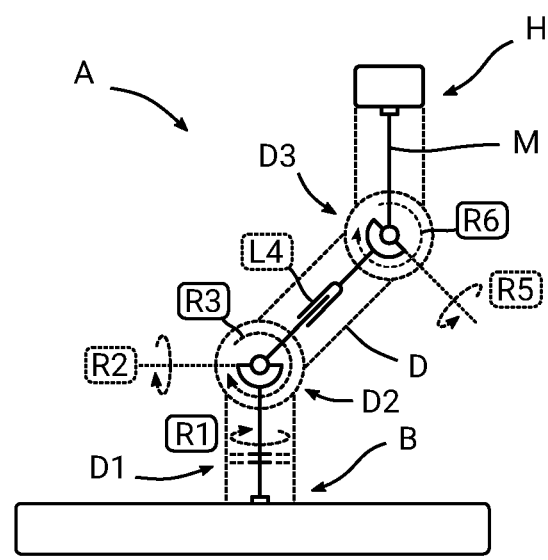
Figure 29:
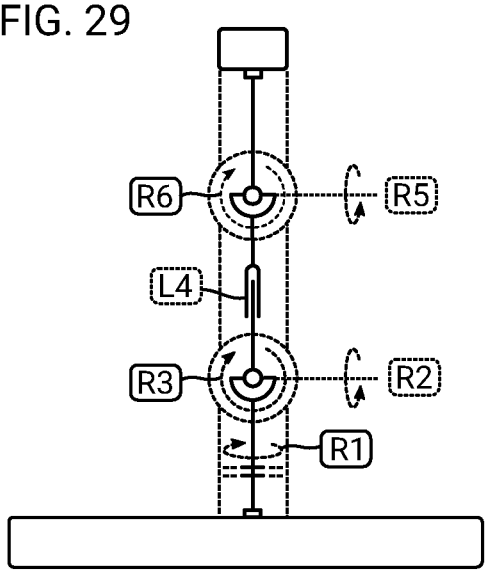
Figure 30:
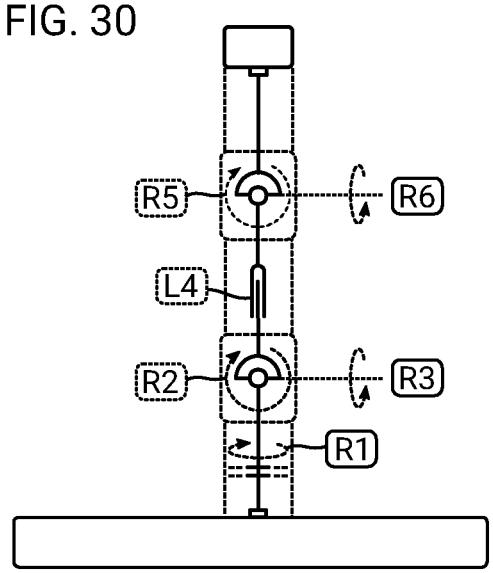
Figure 31:
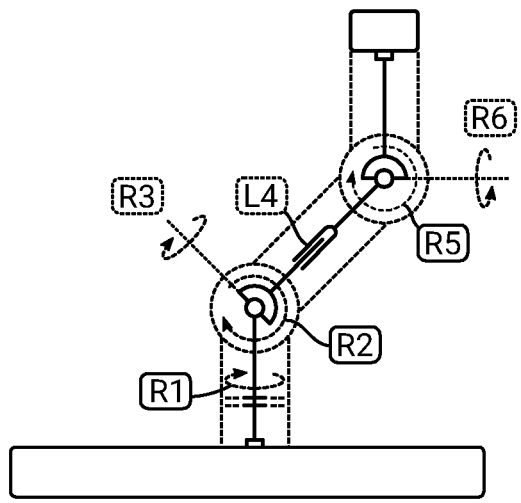
Figure 32:
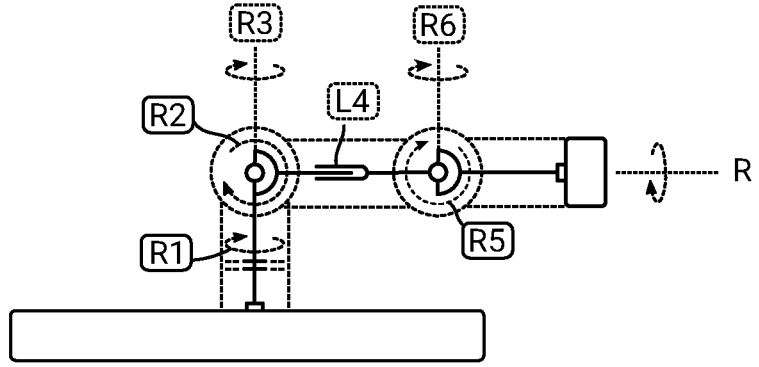
Figure 33:
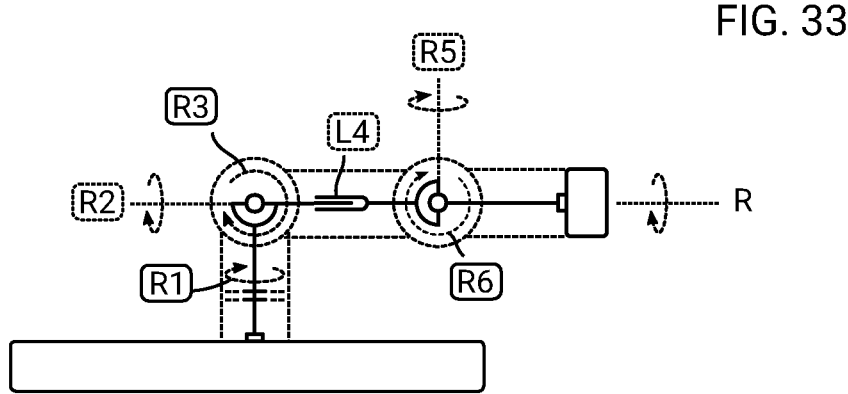
Figure 34A:
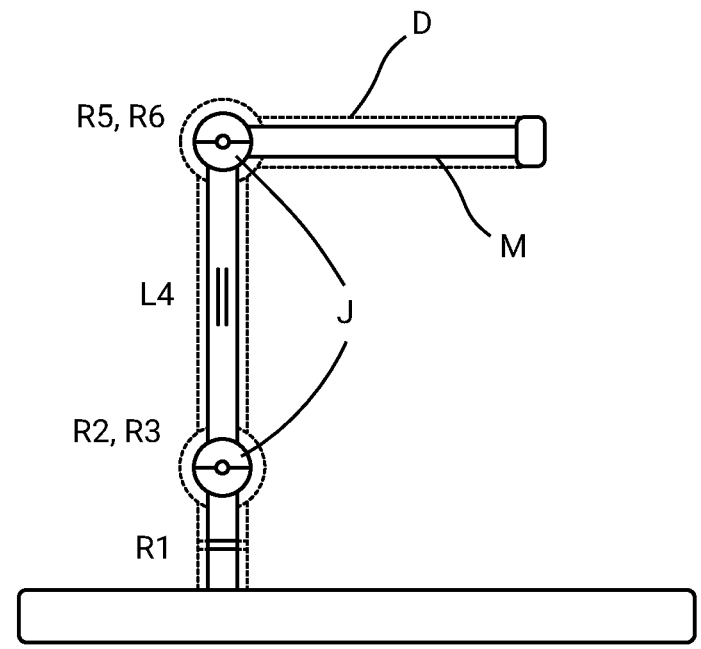
Figure 34B:
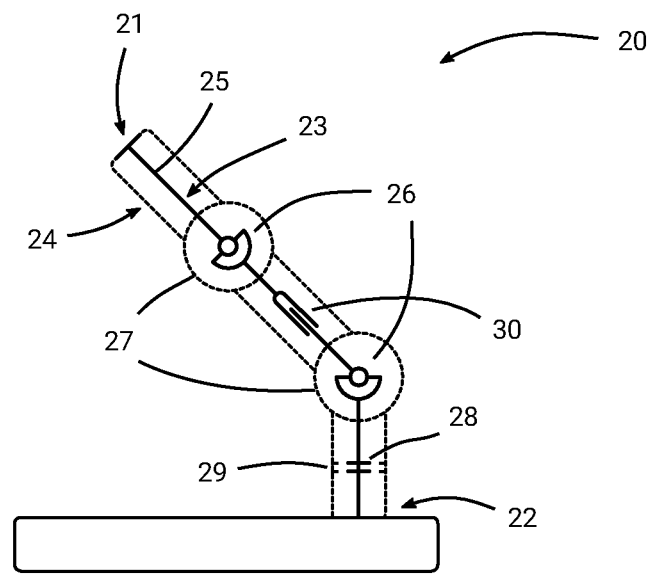
Figure 35:
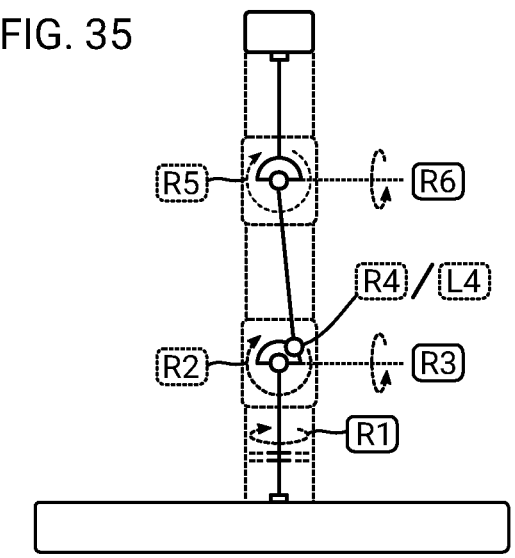
Figure 36A:
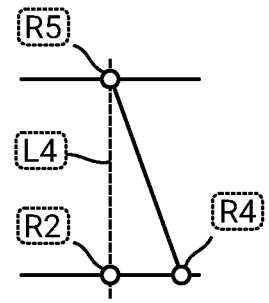
Figure 36B:
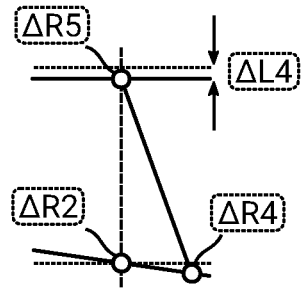
Figure 41A:
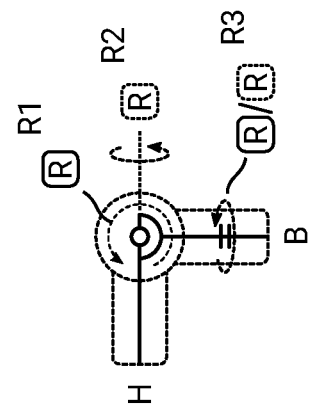
Figure 41B:
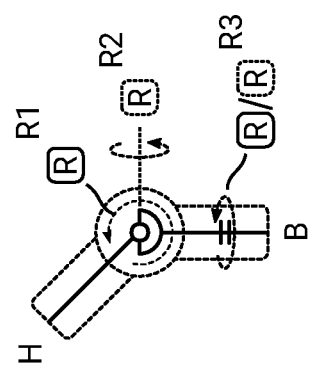
Figure 41C:
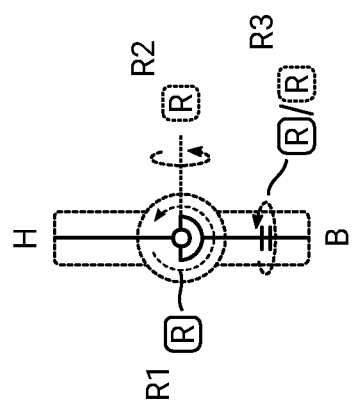
Figure 42A:
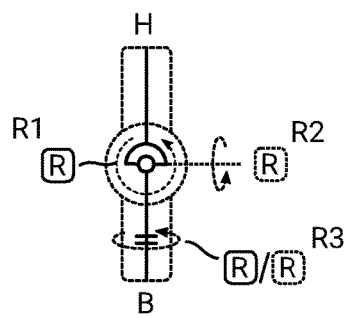
Figure 42A:
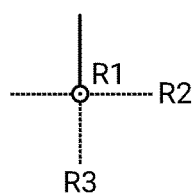
Figure 42B:
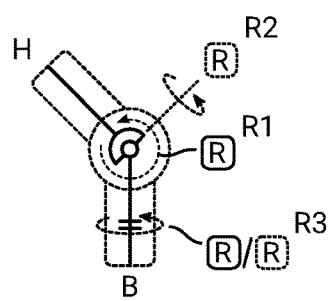
Figure 42B:
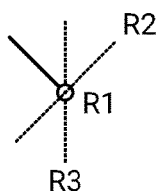
Figure 42C:
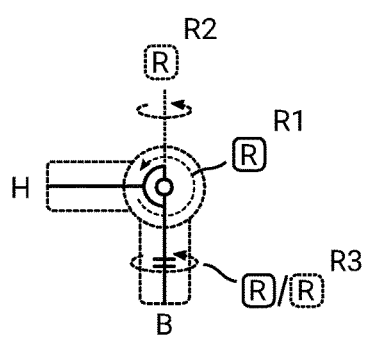
Figure 42C:
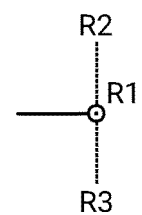
Figure 43A:
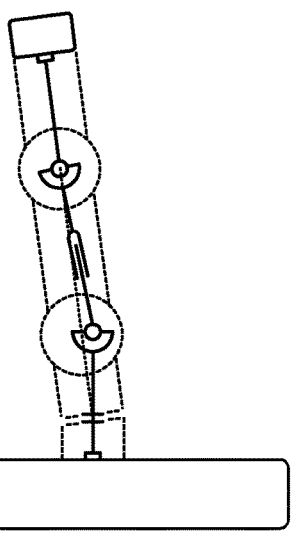
Figure 43B:
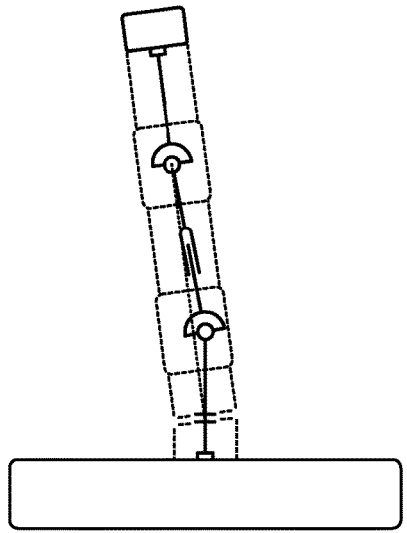
Figure 45:
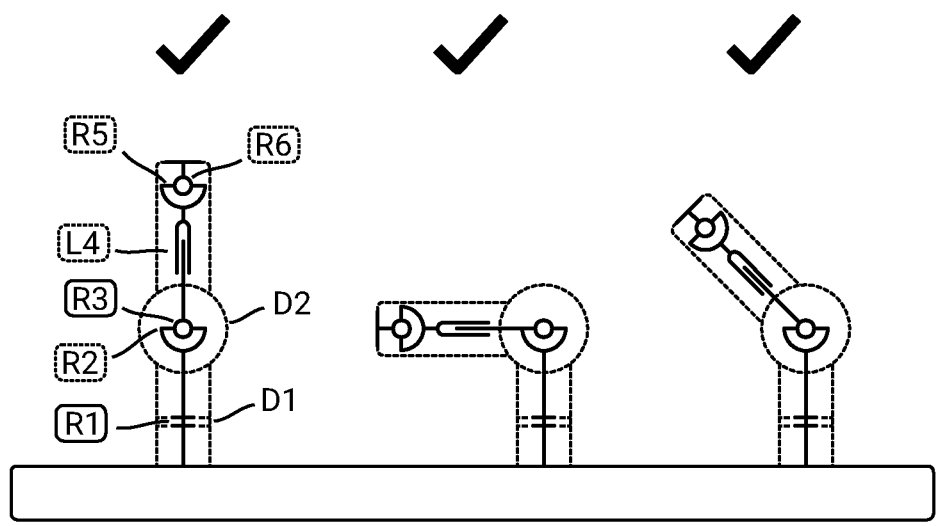
Figure 46:
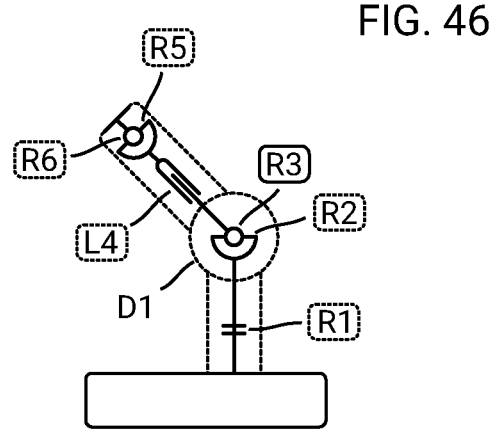
Figure 47:
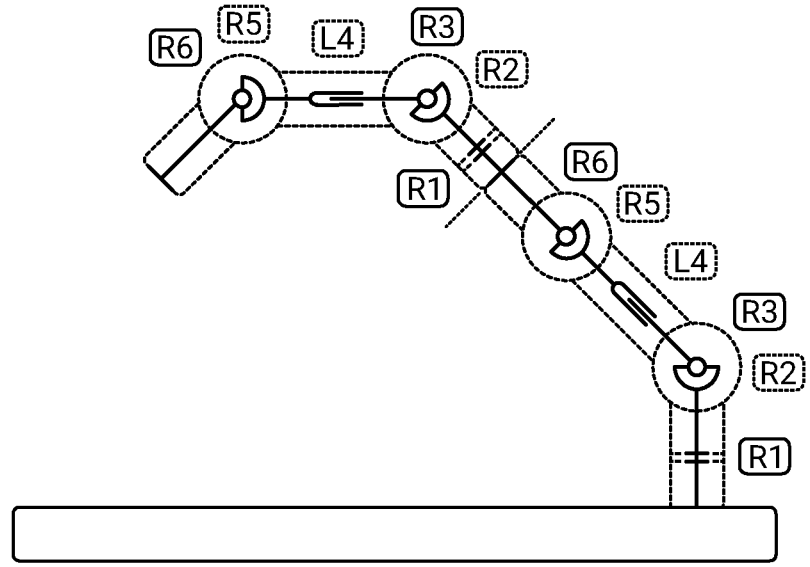
Figure 48:
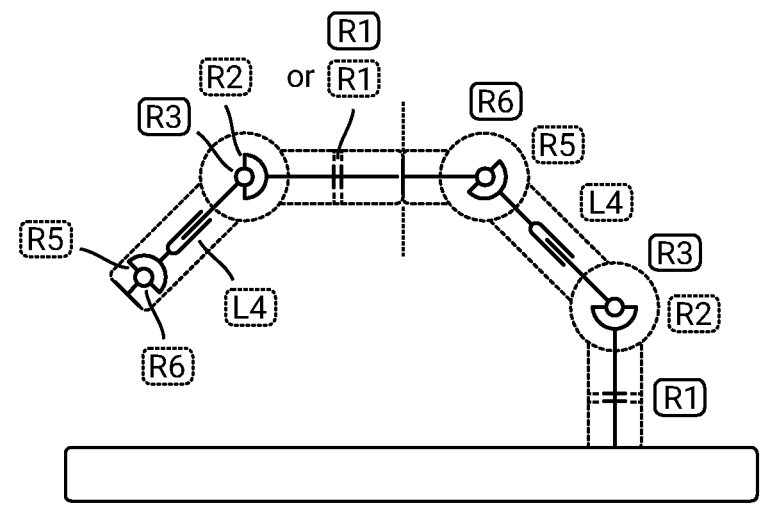
Figure 49A:
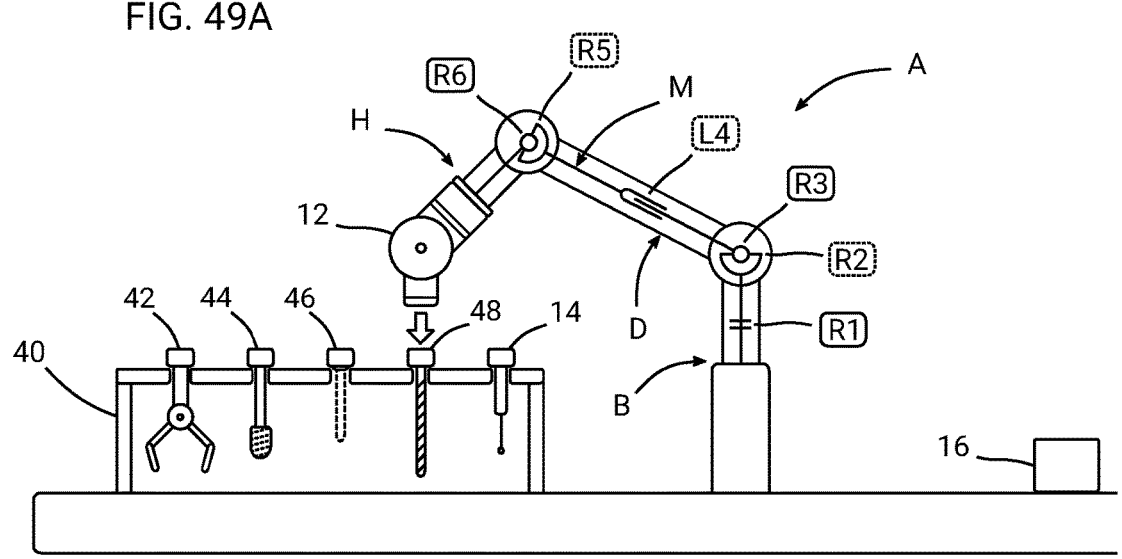
Figure 49B:
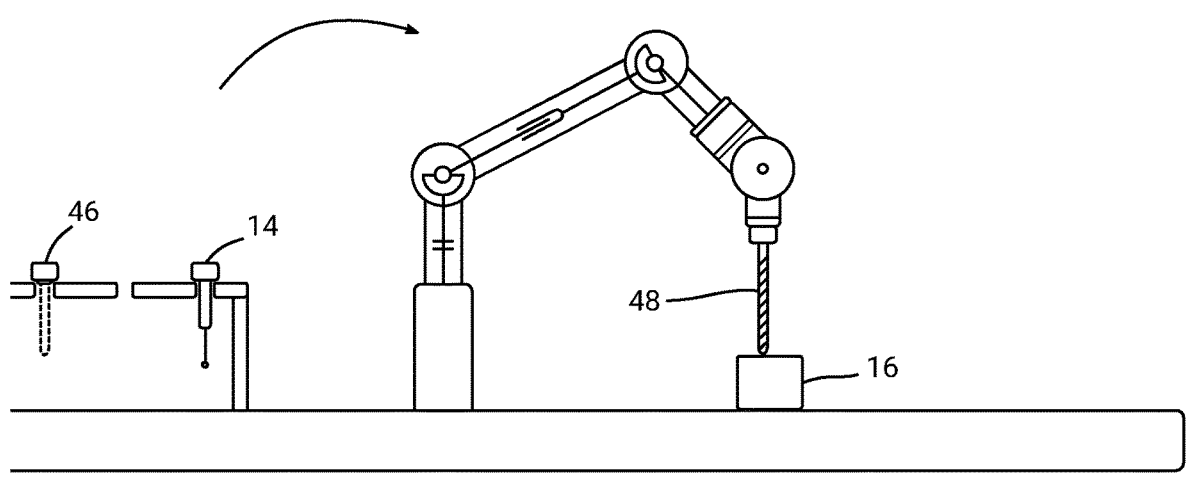

FIGS. 6A and 6B demonstrate the need for an additional degree of freedom in the metrology frame compared to what is illustrated in FIG. 5;

FIG. 7 explains a possible ambiguity that would arise from the metrology results without the additional rotational degree of freedom provided in FIG. 6B;

FIG. 8 schematically illustrates the need for at least six rotational degrees of freedom in the metrology frame for a full three-dimensional example;

FIG. 9 uses a mirrored representation to illustrate how the metrology frame is of a similar overall form to the drive frame with metrology joints corresponding respectively to the drive joints;

FIG. 10 is a non-mirrored version of FIG. 9, illustrating schematically how the metrology frame fits in practice within the drive frame, coupled only at the ends of the coordinate positioning arm and effectively self-supporting in between;

FIG. 11 shows the coordinate positioning arm of FIG. 8 in a fully-extended pose, and is for use in explaining a problem associated with this arrangement of metrology axes;

FIG. 12 shows a side view of the fully-extended coordinate positioning arm of FIG. 11;

FIG. 13 illustrates a pose for the coordinate positioning arm in which only one of the transverse rotary joints is fully extended, and is for use in explaining another problem associated with this arrangement of metrology axes;

FIG. 14 shows how the problem explained with reference to FIG. 13 can be overcome;

FIGS. 15A and 15B illustrate a problem even with the workaround suggested in FIG. 14;

FIGS. 16 to 24 is a series of schematic illustrations which are used to introduce the design principles that form the basis for an embodiment of the present invention, although none of these illustrations represents an embodiment of the present invention as such;

FIG. 25 is a schematic illustration showing a coordinate positioning arm according to an embodiment of the present invention, in which the metrology frame comprises two universal joints, an axial rotary joint, and a linear joint, providing six degrees of freedom for the metrology frame;

FIG. 26 illustrates in more detail a universal joint that is used in the metrology frame of FIG. 25, and is for explaining the way in which the axes making up the universal joint are ordered in an embodiment of the present invention;

FIG. 27 corresponds to FIG. 26 but shows axes of the universal joint being ordered the other way around;

FIG. 28 is a schematic illustration of a coordinate positioning arm with the various metrology axes annotated to show their ordering according to an embodiment of the present invention;

FIGS. 29 and 30 show a front and side view respectively of a coordinate positioning arm according to an embodiment of the present invention, in a pose that corresponds to that of the positioning arm of FIGS. 11 and 12 for ease of comparison;

FIG. 31 illustrates a coordinate positioning arm not embodying the present invention, with the axes of the universal metrology joints in the wrong order, with the arm arranged in a pose corresponding to the embodiment shown in FIG. 28;

FIGS. 32 and 33 respectively illustrate, in the same pose for ease of comparison, a coordinate positioning arm not embodying the invention and a coordinate positioning arm embodying the invention;

FIG. 34A is a schematic illustration, corresponding to that shown in FIG. 10, of how the metrology frame is provided within the envelope of the drive frame in an embodiment of the present invention;

FIG. 34B is for explaining some of the terminology used herein;

FIG. 35 is a side view, corresponding to that of FIG. 30, of an alternative embodiment in which the linear degree of freedom in the metrology frame is provided by rotary axes rather than a linear axis;

FIGS. 36A and 36B show in more detail how a linear degree of freedom is provided by rotary axes in the alternative embodiment of FIG. 35;

FIGS. 37A to 37D are for use in illustrating the concept of over constraint, or rather lack of over constraint, in a metrology joint used in an embodiment of the present invention;

FIGS. 38A to 38E are for use in illustrating the concept of over constraint in a metrology joint used in a positioning arm not embodying the present invention;

FIGS. 39A to 39D show that over constraint is still not present when the joint of FIG. 37C is flipped over;

FIGS. 40A to 40E show that over constraint is still present when the joint of FIG. 38C is flipped over, but in practice is avoided when taking account of an inline rotary axis below the joint;

FIGS. 41A to 41C are for use in explaining key properties of a transverse metrology joint used in an embodiment of the present invention;

FIGS. 42A to 42C are for comparison with FIGS. 41A to 41C, for use in explaining properties of a transverse metrology joint that is not suitable for use in an embodiment of the present invention, with redundant axes in certain poses leading to over constraint;

FIGS. 43A and 43B illustrate the lack of over constraint between the metrology and drive frames in the case of misalignment between the inline rotary drive and metrology axes;

FIGS. 44A to 44D illustrate how multiple coordinate positioning arms embodying the present invention can be combined together in series to create longer arms with more axes overall;

FIG. 45 is a schematic illustration of a two-axis coordinate positioning arm embodying the present invention;

FIG. 46 is a schematic illustration of a single-axis coordinate positioning arm embodying the present invention, mainly of use as a component part of a longer coordinate positioning arm embodying the present invention;

FIG. 47 illustrates how a three-axis component arm can be combined in series with another three-axis component arm to create a six-axis coordinate positioning arm embodying the present invention;

FIG. 48 illustrates how a three-axis component arm can be combined in series with a two-axis component arm to create a five-axis coordinate positioning arm embodying the present invention; and FIGS. 49A and 49B illustrate a manufacturing system that makes use of a coordinate positioning arm embodying the present invention.

Figure 1:
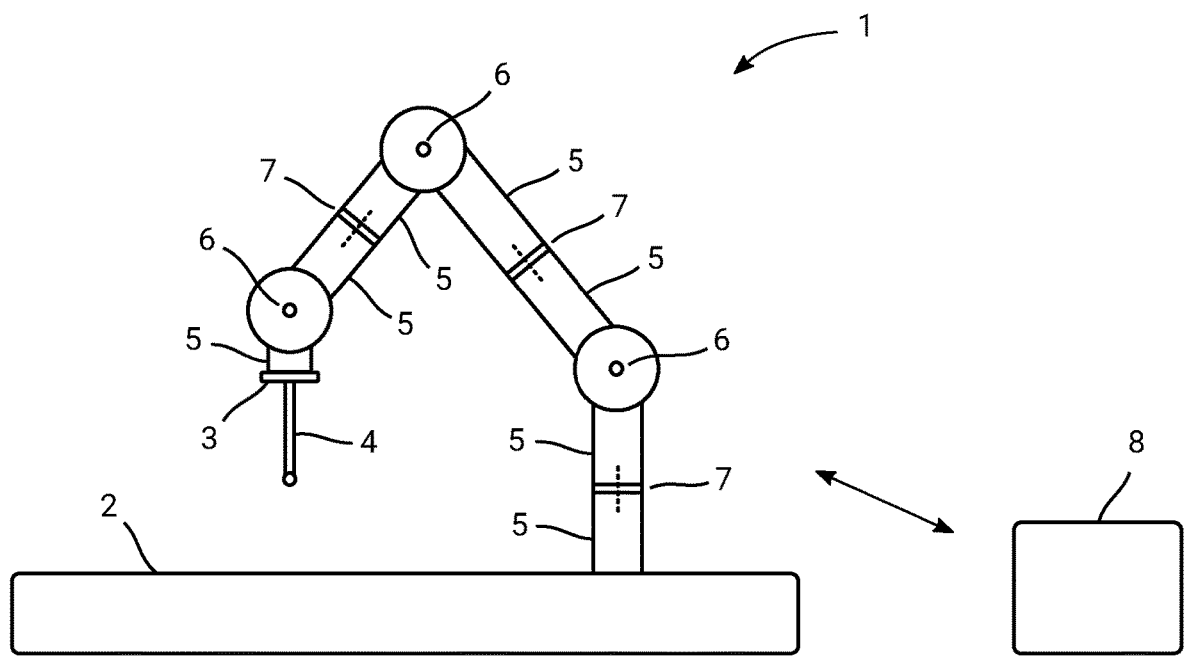

FIG. 2 illustrates a coordinate positioning arm 10 which forms the basis for an embodiment of the present invention. The coordinate positioning arm 10 is similar to that shown in FIG. 1, but is stripped down to having only three rotary axes: two transverse rotary axes 6 and one inline rotary axis 7. The aim is to provide a coordinate positioning arm 10 having a small number of axes and to optimise these to make the coordinate positioning arm 10 highly accurate. The manner in which this is achieved will be discussed in detail further below.

Whilst having just three rotational axes might be sufficient for some applications, in order to provide sufficient versatility for other applications FIG. 3 illustrates how the three-axis coordinate positioning arm 10 of FIG. 2 can be provided with additional degrees of freedom by coupling it with a separate (and already-calibrated) two-axis (or even three-axis) probe head 12. Examples of such a probe head are those made and sold by Renishaw plc under the brand names REVO® and PH20™. A probe head is a separable and separate entity to the coordinate positioning arm itself, and is not considered to form an integral part of the coordinate positioning arm itself.

As illustrated in FIG. 2, the coordinate positioning arm 10 provides rotary axes R1, R2 and R3, while the probe head 12 provides orthogonal rotary axes R4 and R5 and optionally also a further rotary axis R6, providing up to six rotary axes in total. A measurement probe 14 is mounted onto the probe head 12, with the probe head 12 itself being mounted onto the coordinate positioning arm 10. The measurement probe 14 could be a touch trigger probe or a scanning probe. To enable this separability and modularity, the coordinate positioning arm 10 is provided with mounting or coupling features which engage with corresponding mounting or coupling features of the probe head 12, to enable the probe head 12 to be removably and readily coupled to the coordinate positioning arm 10.

FIG. 4 illustrates the operational versatility of such a three-axis coordinate positioning arm 10 coupled to a separate two-axis (or three-axis) probe head 12, with the combined structure 10, 12 having five rotary axes available to position and orientate the measurement probe 14 into an awkward feature of a workpiece 16 such as an angled bore 18, and also having a sixth rotary axis available to rotate the probe 14 around its longitudinal axis (which is particularly useful where the probe 14 is for example a unidirectional probe such as a surface finish probe).

In this way, the accurate coordinate positioning arm 10 of FIG. 2 can be combined with a separate probe head 12 in order to provide a flexible and accurate measurement system. The coordinate positioning arm 10 and probe head 12 can be calibrated separately from one another.

The three-axis coordinate positioning arm 10 will itself now be discussed in more detail, starting with an analysis of the problems associated with providing a metrology frame for such a positioning arm, and how the present applicant has understood the source of these problems and has had the insight to overcome these problems.

FIG. 5 is a schematic illustration of a three-axis coordinate positioning arm A having an outer drive frame D and a separate internal metrology frame M. The metrology frame M is coupled to and supported by the drive frame D only at a base end B and a head end H of the arm A. As will be explained in more detail below, the coordinate positioning arm A can be provided with high metrology performance or accuracy by having a separate metrology frame M, not only because the metrology frame M can be isolated from stresses caused by loading on the drive frame D of the arm A, but also because of the particular design considerations applied to the metrology frame F.

FIG. 6A shows three rotary metrology axes R1, R2 and R3 of the metrology frame M of the arm A of FIG. 5, corresponding to three rotary drive axes of the drive frame D. Rotary axis R1 is an inline rotary axis while rotary axes R2 and R3 are transverse rotary axes. In FIG. 6A there is a rigid coupling between the metrology frame M and the drive frame D at both the head end H and base end B.

Now consider a case where, due to manufacturing tolerances, the final segment of the drive frame D is shorter than expected (shorter than that of FIG. 6A), as is illustrated in FIG. 6B where the length of the final segment has been reduced from L1 to L2. In order to fit the metrology frame F into the shorter overall length of the drive frame D, an additional metrology degree of freedom is required at the head end H in order to accommodate the different (more compact) configuration required of the metrology frame M, and this additional degree of freedom is provided by additional rotary metrology axis R4.

FIG. 7 explains an error or ambiguity that would arise from the metrology results without having the additional rotational degree of freedom provided in FIG. 6B. FIG. 7 shows the same metrology arrangement as FIG. 6B but assumes (incorrectly) that the drive segment lengths are the same as FIG. 6A, with a rigid coupling at the head end H. This leads to the (incorrect) conclusion that final drive segment is arranged at an angle to the vertical, whereas in fact the final drive segment is vertically aligned as shown in FIG. 6B.

Of course, FIG. 6B is a simplified two-dimensional example in which just a single extra metrology axis R4 is provided. FIG. 8 is a schematic illustration of the situation in three dimensions, showing the need for three additional metrology axes R4, R5 and R6 at the head end H, providing a total of six rotational degrees of freedom R1 to R6 in the metrology frame M for a full three-dimensional example. In the configuration (or pose) illustrated in FIG. 8, linear displacement of the head end H into the page can be accommodated by rotation around axis R1 (in combination with changes in other metrology axes R2 to R6).

As an alternative to the schematic representation of FIG. 8, FIG. 9 uses a mirrored representation, with the metrology frame M drawn outside of the drive frame D and mirrored around the vertical dotted line, to illustrate how the metrology frame M is of a similar overall form to the drive frame D with metrology joints corresponding respectively to the drive joints. FIG. 10 is a non-mirrored version of FIG. 9, illustrating schematically how the metrology frame M fits in practice within the drive frame D, coupled only at the head end H and base end B of the coordinate positioning arm A and effectively self-supporting in between.

FIG. 11 shows the coordinate positioning arm of FIG. 8 in a fully-extended pose (or configuration), and is for use in explaining a problem associated with this arrangement of metrology axes R1 to R6. In this pose, linear displacement of the head end H piece into the page (e.g. caused by the drive joint corresponding to metrology axis R3 having a small amount of non-ideal or unwanted rotation around an axis parallel to axis R5) can no longer be accommodated (measured). FIG. 12 shows a side view of coordinate positioning arm of FIG. 11, with a double-headed arrow added to show the motion that cannot be measured by this combination of metrology axes R1 to R6.

The present applicant has appreciated that this problem arises due to the fact that metrology axes R1 and R6 have become aligned or coincident with one another in this pose of the arm (i.e. arranged along the same line), so that there are now effectively only five metrology degrees of freedom rather than six, and therefore insufficient degrees of freedom in the metrology frame M to measure the indicated movement of the head end H. In order to get back to having six "usable" degrees of freedom in this pose, i.e. sufficient degrees of freedom to measure even the indicated head end movement in this pose, a seventh metrology degree of freedom would apparently need to be added (at least in the absence of a further insight by the present applicant).

The whole metrology frame M could rotate 90 degrees around axis R1, and then it could measure the movement mentioned above, but metrology axes R2 and R3 would then be offset 90 degrees from their corresponding drive axes, which is problematic for other reasons. In any case, even if the metrology frame M could flip 90 degrees like that, then it would no longer be possible to measure displacement of the head end H horizontally in the plane of the page. In other words, it is not possible to do both at the same time.

FIG. 13 illustrates a configuration or pose for the coordinate positioning arm in which only one of the transverse rotary joints (that associated with metrology axis R3) is fully extended. This is also presents a problem, because the metrology frame M does not have sufficient degrees of freedom to measure an extension of the drive frame D (for example if there is thermal expansion of the segments making up the drive frame D). FIG. 14 shows how the problem explained with reference to FIG. 13 could be overcome, by "pre-buckling" the metrology frame M, making each segment slightly longer so that there is sufficient "slack" at the start to enable a small amount of stretching to be measured using a combination of rotary metrology axes R2 to R4.

However, FIGS. 15A and 15B illustrates a problem appreciated by the present applicant even with the workaround suggested in FIG. 14. In particular, for each pose or configuration of the drive frame D, there are now two possible configurations for the metrology frame M (or in other words "two metrology solutions"), one of which would cause the metrology frame M to clash with the drive frame D.

FIGS. 16 to 24 is a series of schematic illustrations which are used to introduce the design principles that form the basis for an embodiment of the present invention. Each of these illustrations uses the three-axis arm of FIG. 5 as an example, having separate metrology and drive frames as discussed above, with each of FIGS. 16 to 24 showing this arm in four different configurations or poses. Some of the problems discussed below with reference to FIGS. 16 to 24 echo at least to some extent the problems also described above with reference to FIGS. 6 to 15.

In each of FIGS. 16 to 24, the first pose is a vertical pose in which the upper and middle links are vertically arranged, with both transverse drive joints being at 180 degrees (i.e. straight). In the second pose, the upper drive joint is rotated left through 90 degrees so that the upper drive link is horizontal to the left. In the third pose, the lower drive joint is instead rotated left through 90 degrees with the upper drive joint at 180 degrees (i.e. straight), so that the upper and middle drive links are horizontal to the left. Compared to the third pose, in the fourth (and final) pose the lower drive joint is rotated left through only 45 degrees from the vertical, with the upper drive joint at 180 degrees (i.e. straight).

Figure 16:
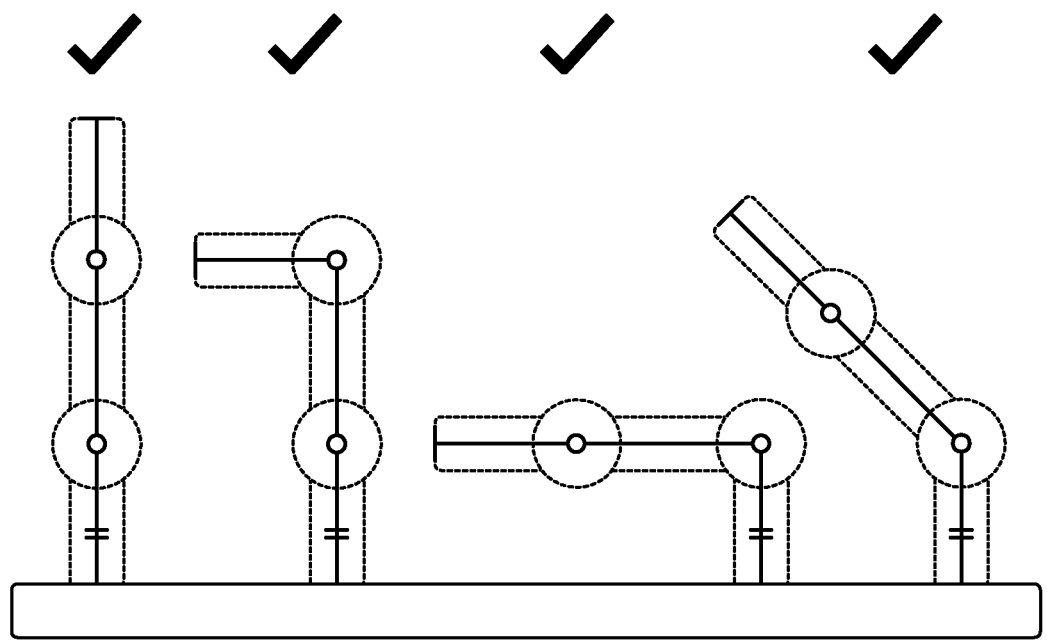

Starting with FIG. 16, this illustrates an "ideal geometry" in which the metrology and drive frames are precisely and accurate manufactured with ideal link (or segment) lengths and ideal axis alignment, such that there is no problem with any of the four example poses (as indicated by the ticks above each of the four illustrated poses). There is no conflict between the metrology and drive frames and the movement of the drive frame D can be accurately and exact measurement by the metrology frame M.

Figure 17:
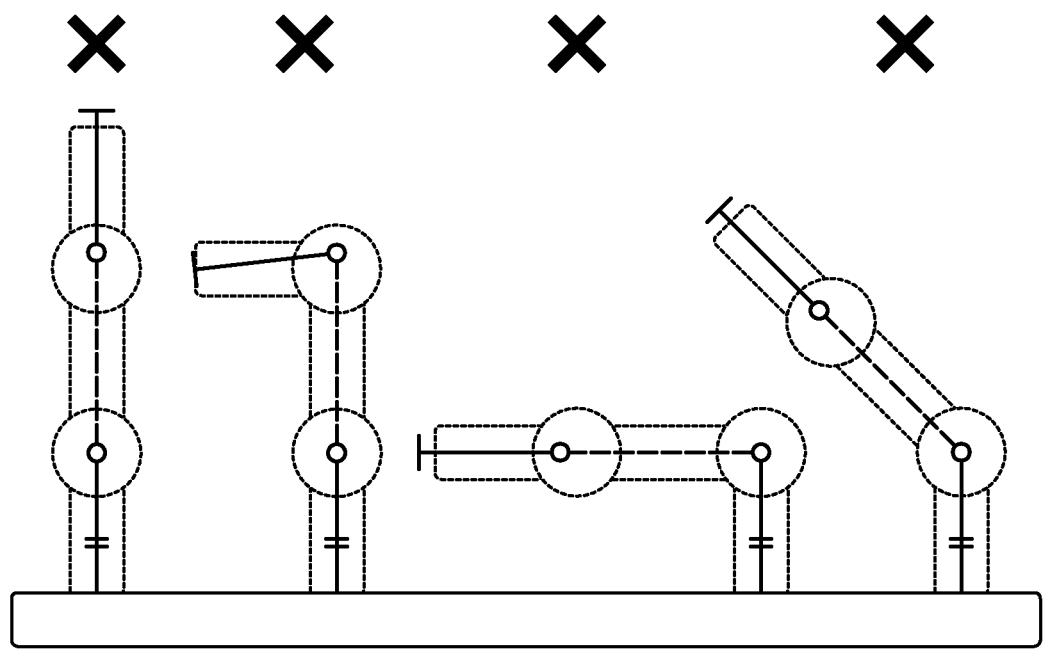

Moving on to FIG. 17, this shows a case where the middle link of the metrology frame (drawn with a dashed rather than solid line) is longer than ideal, for example due to manufacturing or assembly tolerances. For the first pose, because the metrology frame M is coupled rigidly at the head end H to the drive frame D, the longer metrology frame M cannot be accommodated within the drive frame D, shown by the metrology frame M having to extend out beyond the drive frame D at the head end H. In practice, this would cause the drive frame D and metrology frame M to "fight" or be in conflict with one another, since they are both wanting to adopt different configurations. This is of course not ideal, as illustrated by the cross above the first pose. In particular, such a conflict will lead to changes in the metrology frame M that do not directly correspond to changes in the drive frame D, leading to metrology errors and an inaccurate representation of the position and orientation of the head end H relative to the base end B.

For the second pose of FIG. 17, this is again a problem because the longer middle metrology link means that the metrology and drive axes for the upper joint are not aligned, so that the top link of the metrology frame M needs to be at an angle whereas the top link of the drive frame D needs to be exactly horizontal. This discrepancy leads to a conflict between the metrology frame M and the drive frame D, as indicated again by the cross. Likewise, the third and fourth poses of FIG. 17 have a similar problem to the first pose.

In an attempt to overcome the problems described with reference to FIG. 17, a "slider" element has been added in FIG. 18 in order to provide an additional degree of freedom for the metrology frame M, the additional degree of freedom being a linear degree of freedom in the hope that it can absorb the increased length of the middle metrology link. By way of illustration, in FIG. 18 the linear slider element has been inserted into the upper metrology link. However, it can be seen that this improves the situation for the first, third and fourth poses, but the second pose is still a problem because the slider is of no help in addressing the angular conflict between the upper metrology and drive links. In FIG. 19, the linear slider element is moved to the lower-most link, which helps for the first and second poses but not for the third and fourth poses.

Figure 18:
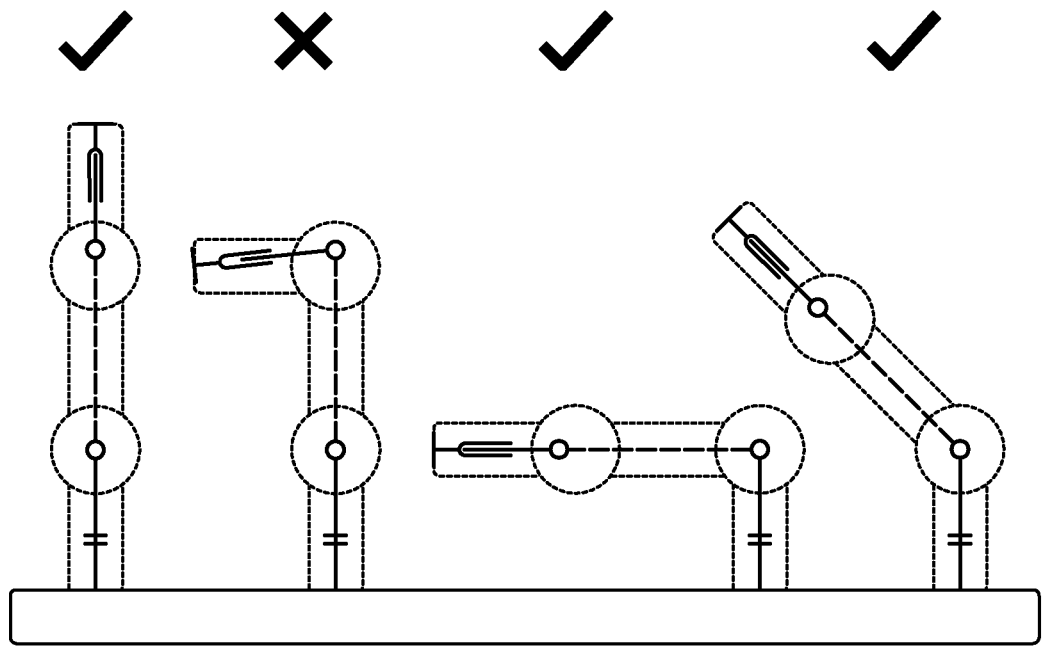
Figure 19:
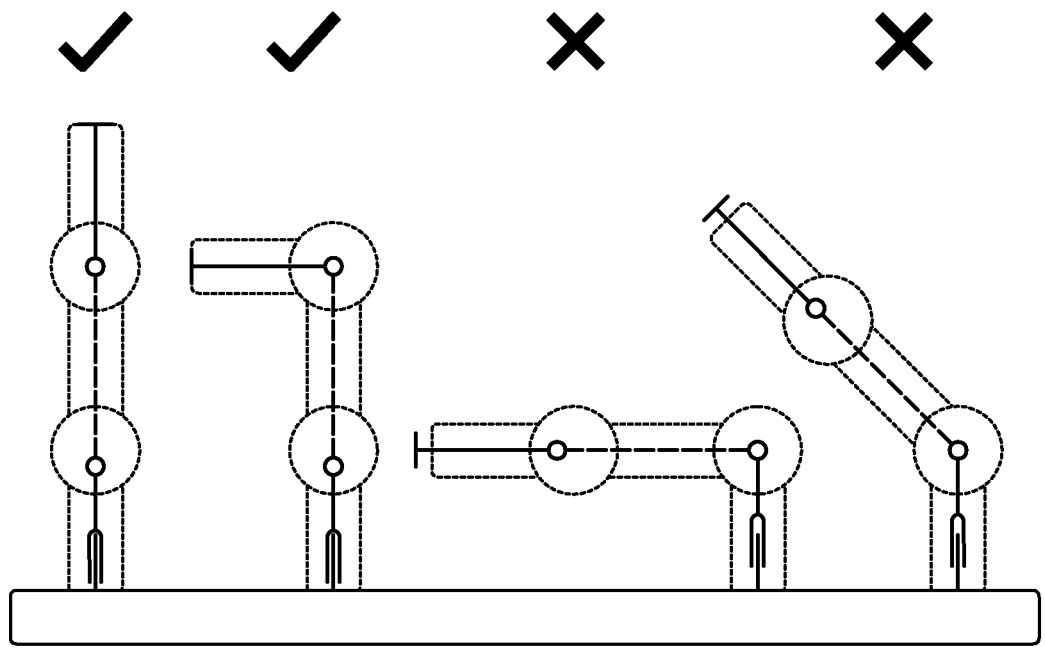

Therefore, the addition of a linear slider as shown in FIGS. 18 and 19 has helped for some poses, but not for others. FIG. 20 shows an alternative possible solution to the problem caused by the longer middle metrology link, with the use of an additional metrology axis at the head end H (equivalent to what was discussed above with reference to FIG. 6B). This would help for all four poses shown in FIGS. 17 to 19, the first two poses of which are also shown in FIG. 20. However, the use of an additional metrology axis at the head end H leads to a different problem, as illustrated by the third and fourth poses of FIG. 20. The third pose of FIG. 20 has been reached by starting with the arm in the second pose of FIG. 20, and rotating the upper joint through 180 degrees to the right, as illustrated by the curved arrow. Because the top axis of the metrology frame M has been displaced up by the longer middle metrology link, so that it no longer coincides with the top axis of the drive frame, when the arm makes the movement from the second to the third pose of FIG. 20, the top metrology axis (or joint) will be pushed out to the right, using the rotation of the lower metrology axis, and in the absence of any constraint from the drive frame D would end up in the configuration shown in the third pose of FIG. 20, i.e. extending well outside of the drive frame D. In practice, because the drive frame is like a shell surrounding the metrology frame M, before reaching the configuration shown in the third pose, the metrology frame M and drive frame D would clash badly, likely leading to damage of one or the other or both. This problem is marked in FIG. 20 by the cross above the third pose. On the other hand, if the arm is instead moved directly from the second pose to the fourth pose of FIG. 20 by rotating around the lower (inline or vertical) drive joint, as shown by the arrow in the fourth pose of FIG. 20, the problem shown in the third pose would be avoided, with the metrology frame M staying within the confines of the drive frame D throughout the move. However, this would complicate control of the arm and in practice it would be difficult to avoid the problem in all cases not least because it is not necessarily known exactly when the problem would occur.

The problem shown in FIG. 20 is equivalent to that discussed above with reference to FIG. 15, in that although adding the top metrology axis may be effective in overcoming the different length of metrology link, the problem is that there are now two possible metrology solutions for each pose (one of which is outside the bounds of the drive frame). This problem of multiple metrology solutions is illustrated further in the example poses shown in FIGS. 21A, 21B and 21C, showing that for each configuration of the metrology frame M there is another alternative configuration which can be found be reflecting the links of the metrology frame in a "mirror line" 13 (see FIG. 21C) drawn between the second and fourth metrology axes.

Figure 22:
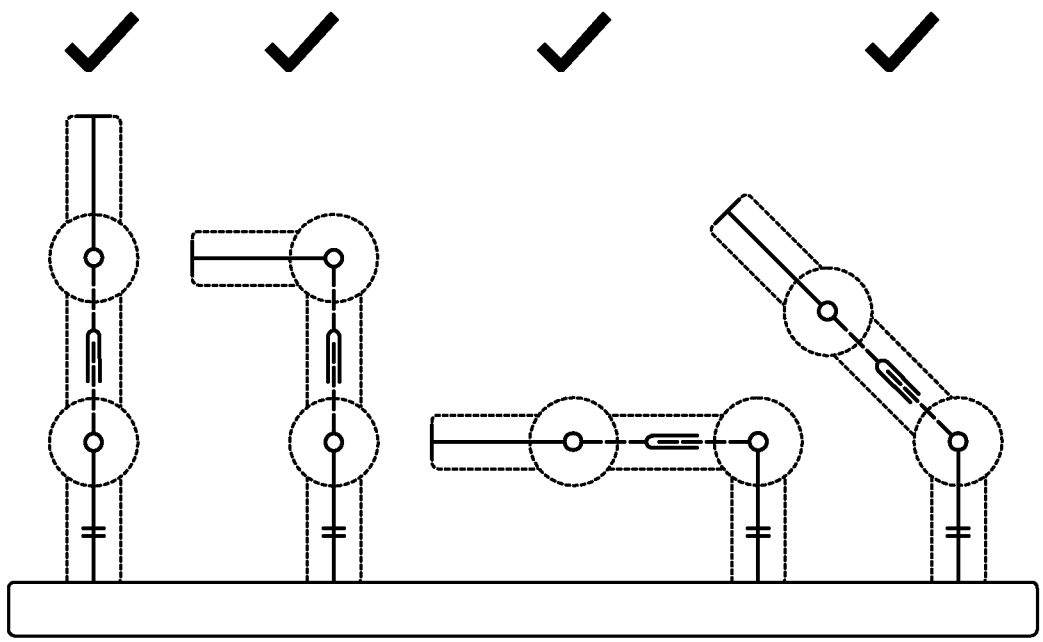

This leads to the arrangement shown in FIG. 22, in which the linear slider element introduced in FIGS. 18 and 19 is now placed within the middle metrology link rather than within the upper metrology link (FIG. 18) or the lower metrology link (FIG. 19). As illustrated in FIG. 22, in this position the linear slider element is now effective in avoiding conflict between the metrology frame M and drive frame D for all four poses. Not only that, but this arrangement remains effective even when the upper metrology link is made longer (rather than the middle metrology link), as illustrated in FIG. 23, and when the lower metrology link is made longer (rather than the middle metrology link), as illustrated in FIG. 24.

Figure 23:
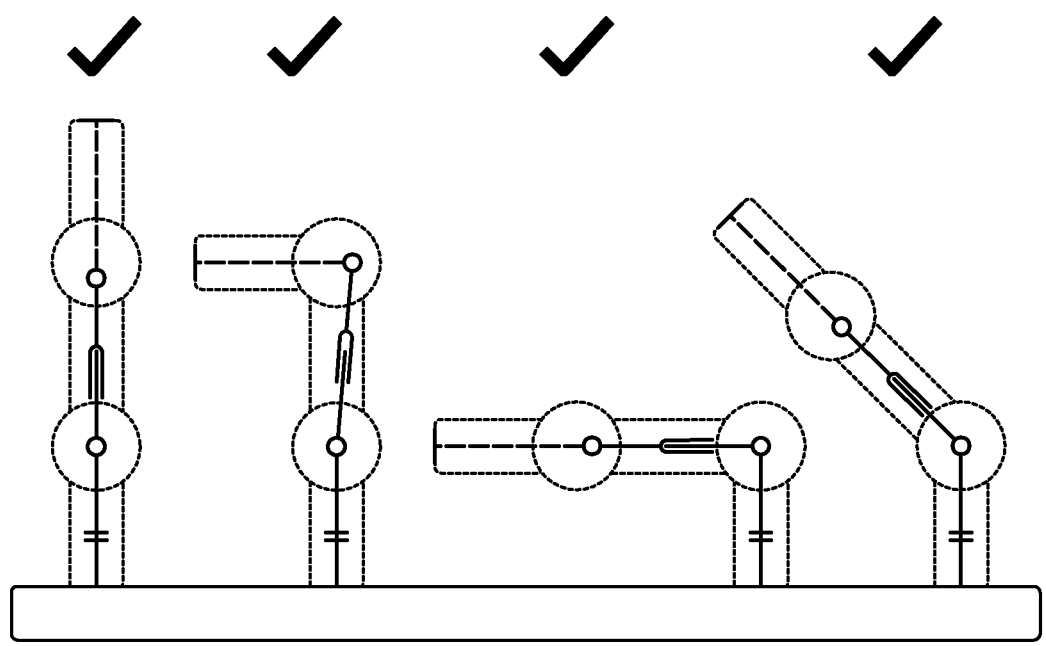
Figure 24:
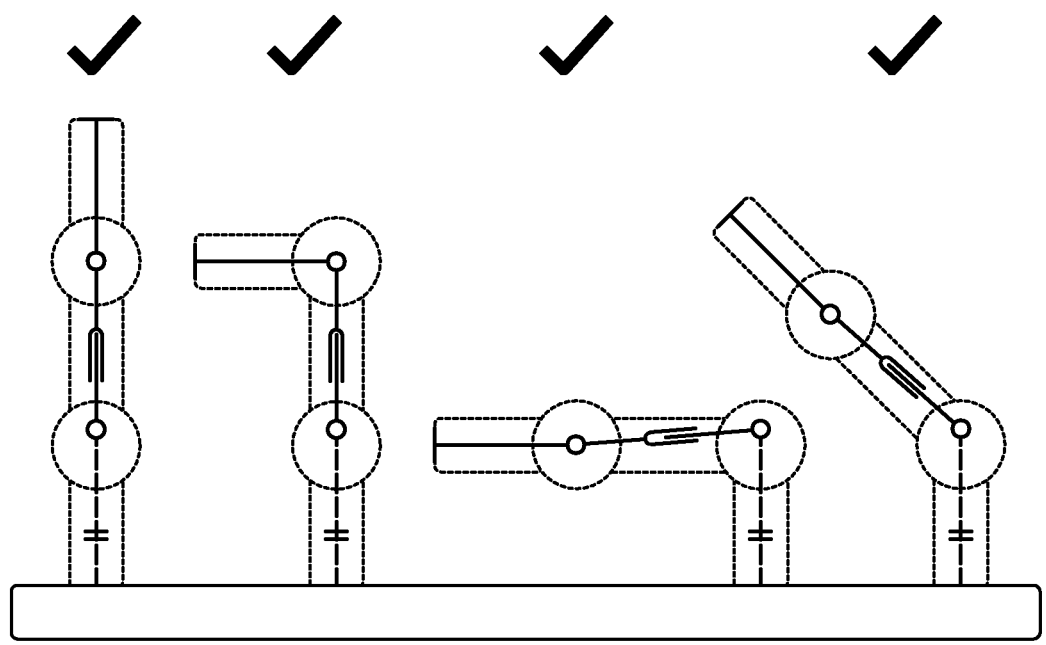

The arrangement for the metrology frame M shown in FIGS. 22 to 24 forms the basis of an embodiment of the present invention, since it has been shown to be effective for all example configurations of the drive frame D. However, it is noted that the above examples have focused on "ideal" movements of the joints of the drive frame D, in which each drive joint has a single axis of rotation. The present applicant has appreciated that each drive joint will not only have a "primary" axis of rotation but in practice will also introduce a degree of inadvertent or unwanted rotation around a "secondary" axis of rotation. To achieve the best performance, these secondary (non-ideal) rotations in the drive frame D must also be accounted for and measured by the metrology frame M.

In view of the above, a full solution embodying the present invention is illustrated schematically in FIG. 25. The metrology frame M of FIG. 25 is based closely on that shown in FIGS. 22 to 24, having three rotary metrology joints corresponding respectively to the three rotary drive joints, as well as a linear metrology joint arranged between the two transverse metrology joints. Two of the rotary metrology joints are transverse rotary metrology joints, while the other rotary metrology joint is an inline rotary metrology joint, matching their corresponding respective drive joints. However, in the arrangement shown in FIG. 25 the two transverse rotary metrology joints are "universal joints" or "Hooke's joints" or "Cardan joints", with each of these joints providing two metrology axes, thereby providing a total of six degrees of freedom for the metrology frame M. These six metrology axes (degrees of freedom) are marked in FIG. 25 as M1 to M6.

Since there are only six axes or degrees of freedom M1 to M6 in the metrology frame M, and since the position and orientation of the head end H of the arm A relative to the base end B of the arm A is ideally to be measured in six degrees of freedom, the present applicant has appreciated the desirability of avoiding "singularities" in the metrology frame M, which is when two axes of the metrology frame M become coincident, thereby effectively losing a degree of freedom in the metrology frame M, bringing it below the number needed to measure relative movement of the head end H and base end B in all six degrees of freedom. These issues were discussed above with reference to FIG. 11.

To overcome the above-mentioned "singularities" problem, the metrology axes within each universal metrology joint in an embodiment of the present invention are arranged in a particular order (i.e. the pair of metrology axes M2, M3 and the pair of metrology axes M5, M6 shown in FIG. 25). This will now be discussed in more detail with reference to FIG. 26, which illustrates a type of universal joint that is suitable for use in the metrology frame M of FIG. 25. Such a universal joint provides two intersecting rotary axes P, S oriented at 90 degrees to each other. Though intersecting one another, the two rotary axes P, S are effectively arranged in series, so the ordering makes a difference, as will now be explained with reference to FIGS. 26 and 27.

In FIG. 26 the two shafts (corresponding to segments of the metrology frame M) connected by the universal joint are marked with B and H, denoting that they are respectively arranged towards (though not necessarily at) the base end B and head end H of the arm A. The rotary axis P in a solid box outline is denoted as the "primary" metrology axis P for the joint, while the rotary axis S in a dotted box outline is denoted as the "secondary" metrology axis S for the joint. The primary metrology axis P is substantially aligned with the primary drive axis for the joint, so that when the arm A is controlled to rotate around this joint, the primary motion is as shown in the schematic illustrations in the lower part of FIG. 26.

A key feature of the arrangement shown in FIG. 26 is that, when viewed in a direction from base end B to head end H, the metrology axes P, S of the joint are arranged with the primary metrology axis P after the secondary metrology axis S. In doing so, it is ensured that the orientation of the secondary metrology axis S is maintained even when the metrology frame M is rotated around the primary metrology axis P. In the schematic illustrations in the lower part of FIG. 26, the primary axis P is shown as a small open circle (with the primary axis P oriented normal to the plane of the page) while the secondary axis S is shown as a short horizontal line between the fork of the universal joint (with the secondary axis S oriented within the plane of the page). It can be seen that the orientation of the secondary axis S is maintained (invariant) as the head end H rotates around to the left (in particular the orientation is maintained relative to the segment of metrology frame M connected to the joint from below, i.e. from the base end B). Because of this, and as will become more apparent from the discussion below (not least that with reference to FIG. 41), the arrangement shown in FIG. 26 is suitable for use in an embodiment of the present invention.

Compare this to FIG. 27, which corresponds closely to FIG. 26 but which shows the metrology axes P, S of the universal joint being ordered the other way around, with the primary metrology axis P (corresponding to the primary drive axis for the joint) coming before the secondary metrology axis S rather than after (when viewed in a direction from base end B to head end H). As shown in the schematic illustrations in the lower part of FIG. 27, with such an ordering of the metrology axes P, S the orientation of the secondary metrology axis S of the joint is now no longer maintained as the head end H rotates around to the left (in particular the orientation is not maintained relative to the segment of metrology frame M connected to the joint from below, i.e. from the base end B). Rather, the secondary metrology axis S rotates around from a horizontal orientation (normal to the metrology segment connected to the joint from below) to a vertical orientation (aligned with the metrology segment connected to the joint from below). Because of this, and as will become more apparent from the discussion below (not least that with reference to FIG. 42), the arrangement shown in FIG. 27 is not suitable for use in an embodiment of the present invention.

FIG. 28 is a schematic illustration of a coordinate positioning arm embodying the present invention, with the various metrology axes annotated to show their ordering in series from the base end B to the head end H of the arm A. This is the same arrangement of metrology axes as shown in FIG. 25. In a direction from the base end B to the head end H, the metrology axes are ordered as follows: R1, R2, R3, L4, R5, R6. The primary metrology axes (shown in solid box outline) are R1, R3 and R6, and the secondary metrology axes (shown in dotted box outline) are R2, L4, and R5. Metrology axis R1 (primary) is provided in an inline rotary metrology joint corresponding to inline rotary drive joint D1. The pair of metrology axes R2, R3 (secondary, primary) is provided in a first transverse rotary metrology joint (corresponding to a first transverse rotary drive joint D2), while the pair of metrology axes R5, R6 (secondary, primary) is provided in a second transverse rotary metrology joint (corresponding to a second transverse rotary drive joint D3). The coupling between the metrology frame M and drive frame D at the base end B and head end H is a rigid coupling, and optionally can be a kinematic coupling to enable the metrology frame M and drive frame D to be readily couplable and decouplable in a repeatable manner.

FIGS. 29 and 30 show a front and side view respectively of a coordinate positioning arm according to an embodiment of the present invention, in a pose that corresponds to that of the positioning arm of FIGS. 11 and 12 for ease of comparison. Using a coordinate positioning arm according to an embodiment of the present invention, as shown in FIGS. 29 and 30, there is no longer any problem in measuring the position and orientation of the head end H relative to the base end B in all six degrees of freedom (as there was with the positioning arm of FIGS. 11 and 12) because with a positioning arm embodying the present invention there are no redundant metrology axes for this pose (there are no "singularities" in the metrology frame M where two or more metrology axes, or combinations thereof, are aligned).

A redundant metrology axis in this context can be considered to be one that could be removed from the metrology frame without losing any degrees of freedom for the metrology frame (for relative motion between the head end and the base end), at least for a particular configuration of the drive frame. It can also be considered to be one that does not provide any additional degree of freedom for the metrology frame (for relative motion between the head end and the base end), at least for a particular configuration of the drive frame. For example, with the metrology frame M of FIG. 11 either of metrology axes R1 or R6 could be removed since (at least for that pose) they both provide the same degree of freedom of movement of the head end H relative to the base end B; the metrology frame M of FIG. 11 has five degrees of freedom for that pose even if one or other of axes R1 and R6 is removed. It is to be noted that this concept of redundancy applies also to a combination of metrology axes, so that if for example the degree of freedom provided by metrology axis Ra for a particular pose is also provided by a combination of metrology axes Rb, Rc and Rd then metrology axis Ra can be considered to be a redundant metrology axis for that pose (even if none of metrology axes Rb, Rc and Rd is actually aligned as such with metrology axis Ra) and it can be considered that there is redundancy in the metrology axes of the metrology frame for that configuration of the drive frame.

FIG. 31 illustrates a coordinate positioning arm not embodying the present invention, with the axes of the universal metrology joints in the "wrong" order, and with the arm arranged in a pose corresponding to the embodiment shown in FIG. 28. Referring to FIG. 32, such an arm is not able to measure rotation R of the head end H around the longitudinal axis of final segment (i.e. that at the head end H) when both the middle and final segments are horizontal. In such a pose, as shown in FIG. 32, metrology axis R3 becomes aligned with metrology axis R1 so the total "available" degrees of freedom in the metrology frame M has effectively dropped from six down to five, just like with the problem situation shown in FIG. 11. Because of this, there is no metrology axis available to measure rotation R of the head end H around the longitudinal axis of final segment (though stretching of the drive frame can be measured using metrology axis L4, i.e. the linear slider element described above). In other words, for the configuration of the drive frame D as shown in FIG. 32, there is a redundancy in the metrology axes of the metrology frame M (there are five degrees of freedom in the metrology M frame regardless of whether one or both of metrology axes R1 and R3 are active).

By contrast, FIG. 33 illustrates a coordinate positioning arm embodying the present invention, in the same pose as the non-embodiment of FIG. 32 for ease of comparison. With the arm of FIG. 33 the axes of the universal metrology joints are in the "correct" order. Accordingly, with this arrangement of metrology axes there are no singularities in the metrology frame M, such that secondary metrology axis R2 is available to measure the inadvertent (non-ideal) rotation R of the head end H about the longitudinal axis of the final arm segment. In other words, for the configuration of the drive frame D as shown in FIG. 33, there is no redundancy in the metrology axes of the metrology frame M (if any one of metrology axes R1 to R6 is dropped then the number of degrees of freedom provided by the metrology frame M decreases).

It can be seen that, in an embodiment of the present invention, the drive frame D and metrology frame M are substantially separate from and/or independent of one another. To understand better what is meant by this, it is to be noted that the drive frame D and metrology frame M of FIG. 5 (for example) cannot be considered as being separate from and/or independent from one another, despite only being coupled at the head end H and base end B. This is because the presence of the metrology frame M creates an additional constraint for the drive frame D owing to there being only three metrology axes (where at least six metrology axes are required to cater for all six degrees of freedom in which the head end H can move relative to the base end B). With an embodiment of the present invention there is separation or independence or mechanical isolation between the drive frame D and metrology frame M to the extent that the drive frame D can move effectively as if the metrology frame M were not there (the metrology frame M effectively provides substantially no extra constraint, for any possible configuration of the drive frame D).

FIG. 34A is a schematic illustration, corresponding to that shown in FIG. 10, of how the metrology frame M is provided within the envelope of the drive frame D in an embodiment of the present invention, including two Hooke's joints of the metrology frame M. FIG. 34B is for explaining some of the terminology used herein, as follows: coordinate positioning arm 20, head end 21, base end 22, metrology frame 23, drive frame 24, segment 25, transverse rotary metrology joints 26 (each comprising two rotary metrology axes), transverse rotary drive joints 27 (each comprising a single transverse rotary drive axis), inline rotary metrology joint 28 (comprising a single inline rotary metrology axis), inline rotary drive joint 29 (comprising a single inline drive axis), and linear metrology joint 30 (comprising a single linear metrology axis).

FIG. 35 is a side view, corresponding to that of FIG. 30, of an alternative embodiment in which the linear degree of freedom L4 in the metrology frame M is provided by multiple rotary metrology axes rather than a linear metrology axis per se. In the alternative embodiment of FIG. 35, an extra rotary metrology axis R4 is provided instead of the linear metrology axis L4 of FIG. 30, so that in effect the metrology frame M consists entirely of rotational degrees of freedom or axes. However, a combination of rotational degrees of freedom can still be considered to provide a linear degree of freedom corresponding to L4, so that the same overall principles as before still apply. In particular, a change in length measured by previous linear axis L4 is now measured by a combination of rotary axes R2, R4 and R5. This is shown in more detail in FIGS. 36A and 36B, which show just R2, R4 and R5 from FIG. 35, in simplified format. In FIG. 36A, L4 represents the separation between axes R2 and R5, while FIG. 36B shows how a change in more detail how a small change ΔL4 in the separation L4 (which is not directly measured in this embodiment) causes small changes ΔR2, ΔR4 and ΔR5 associated respectively with rotary axes R2, R4 and R5. From the measured values for ΔR2, ΔR4 and ΔR5, a value for ΔL4 can be derived. It will be understood that, because these are secondary metrology axes the intention is that they are only measuring small (non-ideal) movements, so that combination of rotary axes R2, R4 and R5 can quite accurately approximate a linear axis L4. Accordingly, it can still be considered that the metrology frame M of FIG. 35 comprises a linear metrology axis L4.

A coordinate positioning arm will now be considered more in relation to the concept of constraint, and how the metrology performance of the arm can be improved in an embodiment of the present invention by avoiding or reducing unnecessary constraint between the drive and metrology frames of the arm. For example, it will be discussed how the ordering of metrology axes in the arm can impact the constraint between the metrology and drive frames of the arm, with metrology performance being improved by taking account of principles already outlined above regarding the arrangement and ordering of metrology axes in the metrology frame.

FIGS. 37A to 37D are for use in illustrating the concept of constraint in relation to a metrology joint used in an embodiment of the present invention. The illustrations are side views of one of the transverse metrology joints of the metrology frame M already discussed above, i.e. corresponding to the view shown in FIG. 30. The primary and secondary metrology axes are marked in FIG. 37A with an R surround by solid and dotted outlines, respectively. The drive axis X of the joint (and corresponding primary metrology axis) are arranged within the plane of the page. In FIGS. 37A and 37C the joint is straight (at 180 degrees), while in FIGS. 37B and 37D the head (upper) end H of the joint has rotated away and into page by 90 degrees relative to the base (lower) end B of the joint. For the sake of simplicity the joint is illustrated as a complete unit, with the metrology frame M and drive frame D being coupled rigidly at the base end B and head end H (even if in an embodiment of the present invention, as discussed above, the joint would form a part of a larger whole).

FIGS. 37A and 37B shows the straight and rotated joint configurations respectively for an ideal case where the drive axis X and primary metrology axis R are perfectly aligned. This would be for an ideal joint (or arm) that is manufactured without any alignment errors. As shown in FIG. 37B, rotation of the drive frame D is accommodated perfectly by the metrology frame M, with the primary metrology axis of the metrology joint measuring the exact amount of rotation and with the secondary metrology axis not being exercised at all (it would measure zero rotation).

In practice, however, there will always be some degree of manufacturing error, within a certain manufacturing tolerance, so that the drive axis X will be slightly misaligned relative to the machine (arm). This is shown in FIG. 37C for the straight joint configuration. It can be seen that, even in this straight configuration, the misalignment of the drive axis X can be accommodated by the metrology joint, with the secondary metrology axis of the metrology joint providing an extra degree of freedom which allows the metrology frame M to follow the misaligned drive frame D. Importantly, this allows the metrology frame M to follow the form of the drive frame D without any additional constraint or tension being introduced between them, and such that the misalignment of the drive axis X is measured by the secondary metrology axis. Likewise, in the rotated configuration shown in FIG. 37D, even though the head end H of the drive frame D is angled or misaligned, this is accommodated by the two degrees of freedom provided by the metrology joint, i.e. there is a degree of freedom in the metrology joint to handle this misalignment.

With the joint shown in FIG. 37 the primary metrology axis is arranged after the secondary metrology axis, in series order from base end B to head end H, i.e. as described previously in respect of an embodiment of the present invention. There is no over constraint between the drive frame D and metrology frame H even when there are manufacturing or assembly errors. Contrast this to what happens when the primary and secondary metrology axes are arranged the "wrong" way around, with the primary metrology axis arranged before the secondary metrology axis in series order from base end B to head end H. Such a situation is shown in the illustrations of FIGS. 38A to 38E, which are for use in illustrating the concept of over constraint in a metrology joint used in a positioning arm not embodying the present invention.

FIGS. 38A and 38B correspond to FIGS. 37A and 37B respectively, showing a case where the drive axis X is perfectly aligned (and so that the drive axis X is perfectly aligned with the primary metrology axis of the joint). There is no problem associated with this joint movement, with the available metrology axes being able to measure the change in joint configuration perfectly. This is because there is no over constraint between the metrology frame M and drive frame D.

FIG. 38C corresponds to FIG. 37C, showing a misalignment introduced into the drive axis X, such that the drive axis X is no longer aligned with the primary metrology axis. For the straight joint configuration shown in FIG. 38C, this misalignment of the drive axis X can be measured by the secondary metrology axis, and there is no over constraint between the drive frame D and the metrology frame M. However, for the rotated joint configuration of FIG. 38D the near end (i.e. at joint) of the rotated (upper) segment of the drive frame D is not aligned with the far end, but there is no degree of freedom available in the metrology frame to handle this. The bottom half of the metrology frame M wants what is shown in FIG. 38D, while the top half of the metrology frame M wants what is shown in FIG. 38E. The metrology and drive frames "fight" against each other, and there is now over constraint between the drive frame D and metrology frame M for a configuration of the drive frame D as shown in FIGS. 38D and 38E. The present applicant has appreciated that such over constraint between the drive frame D and metrology frame M is undesirable because it results in flexing of the metrology frame M that is not measured by any metrology axis. In this respect, it is only rotations around the metrology axes that result in a metrology signal, and any flexing or bending or twisting of the structure between the metrology axes does not result in a change in any metrology signal despite the metrology frame M having changed in form. This leads to metrology errors, and errors in the position and orientation calculated for the head end H of the arm A relative to the base end B.

To relieve this over constraint, another inline (vertical) rotary degree of freedom could be added to the metrology frame M above the joint but this would lead to redundant axes and multiple metrology solutions (as discussed above) because in practice there is already a vertical axis below the joint. An embodiment of the present invention is able to avoid such over constraint between the metrology and drive frames even for a rotated configuration of the drive frame D, as shown in FIG. 37D, and without the need for an extra degree of freedom in the metrology frame M.

From the above it is apparent that over constraint is created between the metrology and drive frames for certain configurations of the drive frame when the primary and secondary metrology axes of the metrology joint are in the "wrong" order, while there is no such over constraint for these drive frame configurations when the primary and secondary metrology axes of the metrology joint are in the "right" order. Of course, the presence or absence of over constraint of a joint, when the joint is considered in isolation, should not depend the absolute orientation of the joint in space. For example, merely turning the joint of FIG. 37C upside down (so that the metrology axes of the joint are then apparently in the "wrong" order) should not suddenly introduce over constraint between the drive and metrology frames when there was none before. This will be discussed with reference to FIGS. 39 and 40.

FIG. 39A shows the joint of FIG. 37C without any change other than to flip the joint over, and FIG. 39B shows the joint of FIG. 39A re-oriented slightly to make the lower segment vertical for consistency with the representations of FIG. 37. In FIG. 39C the only further change is to make the upper segment fit within the lower segment, again for consistency with the representations of FIG. 37. Therefore, since the metrology axes were in the "right" order before flipping (FIG. 37C) they are now in the "wrong" order after flipping (FIG. 39C).

However, when the joint is in a rotated configuration as shown in FIG. 39D, because the drive and metrology axes are aligned there is still no fighting between the metrology and drive frames. In particular, the now-vertical (secondary) metrology axis of the Hooke's joint copes with the upper segment being angled to the left (the far end surface of the segment is angled relative to the page). Thus, as expected, there is still no over constraint between the metrology and drive frames. But this is despite the metrology axes now being in the "wrong" order. However, it should be borne in mind that the simplified representation considers just a single joint in isolation, with rigid couplings at the base and head ends, i.e. effectively a single-axis arm. In practice, this joint would be one of a plurality of joints in the arm, and although that joint configuration of FIG. 39D exhibits no over constraint despite the axes being in the "wrong" order, it is still not suitable for an embodiment of the present invention because the secondary metrology axis of the joint rotates, with the risk of singularities being created in the metrology frame for certain other configurations of the drive frame, as discussed above. Such singularities (leading to insufficient metrology axes) when create constraint problems, even if the particular configuration of one joint (as shown in FIG. 39D) is alright. The concept of over constraint, and in particular the desire to avoid constraint between the metrology and drive frames, applies collectively to all of the axes rather than just a subset of the axes, as indeed will be apparent from the discussion relating to FIG. 40.

FIG. 40A shows the joint of FIG. 38C without changes other than to flip the joint over, and FIG. 40B shows the joint of FIG. 40A re-oriented slightly to make the lower segment vertical for consistency with the representations of FIG. 38. In FIG. 40C the only further change is to make the upper segment fit within the lower segment, again for consistency with the representations of FIG. 38. As illustrated in FIG. 40D, for the rotated joint configuration, despite the primary and second metrology axes of the joint now apparently being in the "right" order (after flipping from FIG. 38C where they were in the "wrong" order), there is apparently still over constraint, since the bottom half wants the primary axis within the plane of page, but the top half (folded over) wants it angled towards the far end (rotated about vertical axis). Indeed, one should not be able to make the joint work in this respect merely by flipping the joint over in space. However, in practice this arrangement does work (i.e. does not lead to over constraint between the metrology and drive frames) when provided as part of a complete arm, and in particular when taking account of a rotary metrology axis from further down, as is illustrated in FIG. 40E. As shown in FIG. 40E, the extra rotary metrology axis below the joint is able to deal with the angling of the top segment in the rotated drive configuration, thereby avoiding over constraint between the metrology and drive frames. As stated above, the concept of over constraint, and in particular the desire to avoid constraint between the metrology and drive frames, applies collectively to all of the axes of the arm rather than just a subset of the axes.

FIGS. 41A to 41C are for use in explaining the properties of a transverse metrology joint used in an embodiment of the present invention. The properties of a transverse rotary metrology joint are: (a) there are two rotational degrees of freedom (primary R1, secondary R2) from the joint itself; (b) there is another rotational degree of freedom (R3) from other joint(s) arranged below the joint; and (c) the joint provides an axial rotational degree of freedom to anything above the joint. It is to be noted that there does not need to be a corresponding rotary drive axis below the joint, just another rotary metrology axis (the drive frame could be rigid below the joint). It is also noted that, because of the relative ordering of primary metrology axis R1 and secondary metrology axis R2, the moving segment (see the solid line in the lower schematic representations) is always within 45 degrees of a rotary metrology degree of freedom (R2, R3) throughout the change in joint configuration from straight (FIG. 41A) to angled (FIG. 41B) to right-angled (FIG. 41C). In particular, the secondary metrology axis (R2) does not move, thereby preventing the occurrence of singularities. This enables the metrology frame M to handle (measure) a small non-ideal movement of the head end H, such as twisting, regardless of the drive configuration, since there is always a metrology axis or combination thereof that can handle (measure) such a movement.

FIGS. 42A to 42C are for comparison with FIGS. 41A to 41C, for use in explaining properties of a transverse metrology joint that is not suitable for use in an embodiment of the present invention, with the primary and secondary metrology axes of the joint being in the wrong order, and with redundant axes in certain poses leading to over constraint. Referring in particular to the joint configuration shown in FIG. 42C, it can be seen that there are redundant axes (R2, R3), which in turn means that no (measurable) rotation is possible around the strut axis (i.e. the longitudinal axis of the moving strut) because there is no metrology axis available. This in turn creates over constraint between the metrology and drive frames, with the redundant axes leading to over constraint due to there being insufficient degrees of freedom available. Hence the metrology frame "fights" with the drive frame. This could be addressed by adding more degrees of freedom, but then there would be too many degrees of freedom available for other drive configurations (or poses), and accordingly there would undesirably be multiple metrology solutions.

FIGS. 43A and 43B focus more on the inline rotary drive and metrology axes (rather than the transverse rotary drive and metrology axes), and illustrate that there is no over constraint between the metrology and drive frames even in the case of misalignment (e.g. due to manufacturing or assembly errors) between the inline rotary drive and metrology axes. In particular, it can be seen that sufficient degrees of freedom are available in the metrology frame M to avoid creating over constraint between the metrology frame M and drive frame D, with the "slack" being taken up (and in particular measured) by a combination of metrology axes. FIG. 43B shows a view that is rotated by 90 degrees compared to the view of FIG. 43A.

Figure 44D:
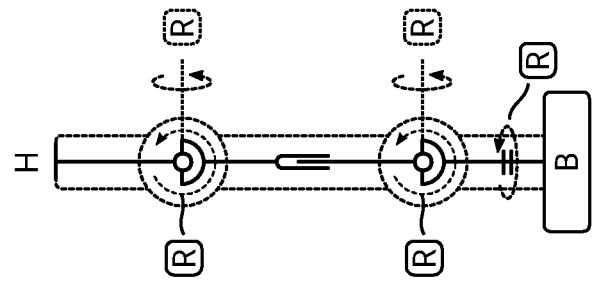
Figure 44C:
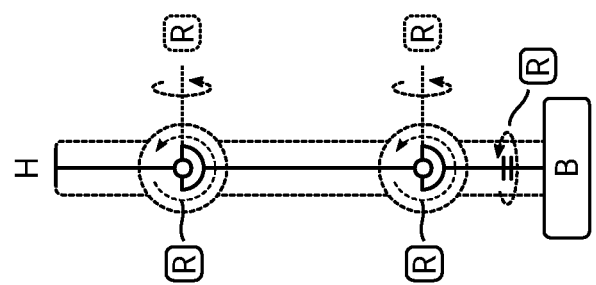
Figure 44B:
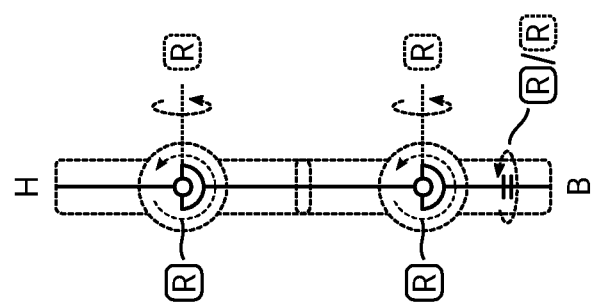
Figure 44A:
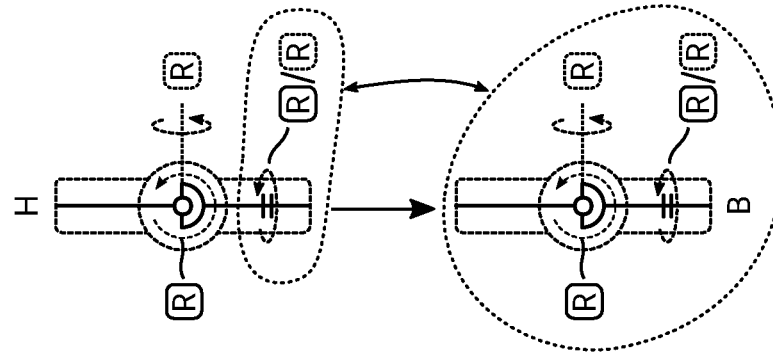

FIGS. 44A to 44D illustrate how multiple "core units" from FIG. 41 are together in series to create an arm according to an embodiment of the present invention. In particular, FIG. 44A shows two such core units arranged separately, FIG. 44B shows them brought together but not fully combined, FIG. 44C shows them fully combined, and FIG. 44D shows the introduction of an additional linear metrology axis at the point where the two units were combined. The resulting arm A is as described previously.

FIG. 45 is a schematic illustration of a two-axis coordinate positioning arm embodying the present invention, i.e. a coordinate positioning arm having two drive axes D1, D2. To make this two-axis version work for all poses (drive configurations), as well as an inline rotary metrology axis (primary) corresponding to the inline drive axis D1, and a universal metrology joint (with secondary/primary metrology axes R2/R3) corresponding to the transverse rotary drive joint D2, another linear axis L4 (secondary) is introduced as well as another universal metrology joint (with secondary metrology axes R5, R6). Therefore the metrology axes for this embodiment are, in order from base end B to head end H: R1 (primary), R2 (secondary), R3 (primary), L4 (secondary), R5 (secondary) and R6 (secondary). Since there is no drive axis corresponding to the universal metrology joint comprising metrology axes R5 and R6, and since both of these are therefore secondary metrology axes, the ordering of these two axes R5, R6 is not important.

FIG. 46 is a schematic illustration of a single-axis coordinate positioning arm embodying the present invention, having a single transverse rotary drive axis D1. This embodiment is the same as that shown in FIG. 45, but with the primary metrology axis R1 of FIG. 45 becoming a secondary metrology axis R1 for FIG. 46, since there is no corresponding drive axis for this metrology joint. A single-axis unit as shown in FIG. 46 would mainly be of use as a component part of a longer coordinate positioning arm embodying the present invention.

FIG. 47 illustrates how a three-axis component arm can be combined in series with another three-axis component arm to create a six-axis coordinate positioning arm embodying the present invention. The axial rotary drive axis of the second component arm (i.e. the one closest to the head end H) could be removed so that the corresponding segment is entirely rigid. In that case the corresponding metrology axis R1 could also be removed or could be considered to provide a secondary metrology axis (without any corresponding drive axis). The same applies to the axial rotary drive axis of the first component arm (i.e. the one closest to the base end B), but in practice it would be retained to provide the required versatility for the arm. FIG. 48 illustrates how a three-axis component arm can be combined in series with a two-axis or single-axis component arm to create a five-axis or four-axis coordinate positioning arm embodying the present invention. Other combinations are possible too.

As already mentioned, the head end H of the arm A is advantageously adapted for receiving and carrying an operational tool, such a measurement probe in a measurement application or a gripper in an assembly or manipulation application. Similarly to what was described with reference to FIGS. 3 and 4, the tool is advantageously carried by the arm via a pre-calibrated probe head 12, in order to provide an extra two or three axes for the arm. For this purpose, the head end H comprises coupling features adapted to couple with corresponding coupling features provided on the operational tool (or the probe head). These possibilities are illustrated schematically in FIGS. 49A and 49B, which shows a manufacturing system and method using a coordinate positioning arm A embodying the present invention. The metrology axes R1 to R6 of the metrology frame M of the arm A, as described previously, are also marked in FIG. 49A, as is the drive frame D, the base end B and the head end H.

As shown in FIG. 49A, a tool rack (or tool holder) 50 is provided within the working volume of the arm A. A variety of tools are held in the rack 50, including a gripper 42, a milling tool 44, a laser cutting tool 46, a drilling tool 48 and a measurement probe 14. A modular coupling system is used such that each of the tools can be removably coupled to the head end H of the arm A via the articulated probe head 12 as and when required, i.e. picked up from the rack 50 and used to perform an operation, then dropped back in the rack 50 so that another tool can be picked up, if required. The removable coupling enables this to be achieved with relative ease and without manual intervention, in an automated manner, so that it can be used in an automated manufacturing process. Because of the inherent accuracy of the arm A, due to the features presented previously, the arm A is capable of acting both as a positioning machine and as a measuring machine.

For example, the arm A can use the gripper 42 for picking and placing a workpiece 16 onto the machine bed (carried out in a step before what is shown in FIG. 49A), then swap the gripper 42 for the drilling tool 48 (the step for which is being carried out in FIG. 49A), and then drill the workpiece 16 using the drilling tool 48 (as shown in FIG. 49B). Subsequently, the drilling tool 48 can be swapped for the measurement probe 14 from the tool rack 50 (in a step carried out after what is shown in FIG. 49B), so that the arm A can move back to the machined workpiece 16 to measure and inspect the machined features to check that the features are within the required tolerances.

The invention claimed is:

1. A coordinate positioning arm comprising:
   a base end and a head end;
   a drive frame for moving the head end relative to the base end; and
   a metrology frame for measuring a position and orientation of the head end relative to the base end;
   wherein the drive frame comprises a plurality of drive axes arranged in series between the base and head ends;
   wherein the metrology frame comprises a plurality of metrology axes arranged in series between the base and head ends; and
   wherein the metrology frame is substantially separate and/or independent from the drive frame.

2. A coordinate positioning arm as claimed in claim 1, wherein the metrology axes provide the metrology frame with sufficient degrees of freedom to avoid creating over constraint between the metrology and drive frames, and/or wherein the metrology axes provide the metrology frame with sufficient degrees of freedom to avoid creating an additional constraint for the drive frame between the base and head ends other than what is already provided by the drive axes themselves.

3. A coordinate positioning arm as claimed in claim 1, wherein the metrology axes are arranged to provide the metrology frame with insufficient degrees of freedom to enable more than one configuration for the metrology frame for each configuration of the drive frame, and/or wherein the metrology and drive axes are mutually arranged to provide only one possible configuration for the metrology frame for each configuration of the drive frame.

4. A coordinate positioning arm as claimed in claim 1, wherein for each configuration of the drive frame there is no redundancy in the metrology axes of the metrology frame, and/or wherein the metrology and drive axes are arranged such that there is no configuration for the drive frame in which two metrology axes of the metrology frame become aligned.

5. A coordinate positioning arm as claimed in claim 1, wherein at least one drive axis has an associated primary metrology axis and an associated secondary metrology axis, and for each such drive axis the secondary metrology axis is arranged before the primary metrology axis in series order from the base end to the head end.

6. A coordinate positioning arm as claimed in claim 1, wherein the metrology frame is supported by and/or coupled to the drive frame substantially only at the base and head ends, for example with any intermediate support between the base and head ends having an insubstantial effect on a measurement or measurement signal from or associated with any or each of the metrology axes of the metrology frame and/or an insubstantial effect on any or each value derived for the position and/or orientation of the head end, or the position of a point on the head end, relative to the base end.

7. A coordinate positioning arm as claimed in claim 1, wherein the metrology frame is adapted to measure a position and orientation of the head end relative to the base end in six degrees of freedom and/or wherein the metrology frame comprises six metrology axes.

8. A coordinate positioning arm as claimed in claim 1, wherein the drive frame comprises three drive axes, with three of the metrology axes being substantially aligned respectively with the three drive axes, and/or wherein the drive frame comprises three rotary drive axes, two of which rotary drive axes are transverse and the other of which is inline.

9. A coordinate positioning arm as claimed in claim 1, wherein the metrology frame comprises at least one linear metrology axis.

10. A coordinate positioning arm as claimed in claim 1, wherein the metrology axes provide: three primary rotational degrees of freedom, two secondary rotational degrees of freedom, and one secondary linear degree of freedom.

11. A coordinate positioning arm as claimed in claim 10, wherein the drive frame comprises three rotary drive axes, two of which rotary drive axes are transverse and the other of which is inline, and wherein: the three primary rotational degrees of freedom are associated respectively with the three rotary drive axes; the two secondary rotational degrees of freedom are associated respectively with the two transverse drive axes; and the secondary linear degree of freedom is not associated at least directly with any drive axis.

12. A coordinate positioning arm as claimed in claim 1, wherein the metrology frame comprises a plurality of metrology joints, with each metrology joint comprising at least one of the metrology axes of the metrology frame, and wherein each drive axis is provided with a corresponding metrology joint and/or wherein the at least one metrology axis of each metrology joint provides a primary degree of freedom that is substantially aligned with the corresponding drive axis.

13. A coordinate positioning arm as claimed in claim 12, wherein at least one transverse metrology joint comprises metrology axes that provide primary and secondary rotational degrees of freedom, with the primary rotational degree of freedom being substantially aligned with the corresponding drive axis, and wherein the secondary rotational degree of freedom is substantially orthogonal to the primary rotational degree of freedom.

14. A coordinate positioning arm as claimed in claim 13, wherein the primary rotational degree of freedom is arranged after the secondary rotational degree of freedom in series.

15. A coordinate positioning arm as claimed in claim 13, wherein the orientation of the secondary rotational degree of freedom is substantially invariant to rotation around the primary rotational degree of freedom.

16. A coordinate positioning arm as claimed in claim 13, wherein the primary and secondary rotational degrees of freedom are provided respectively by primary and secondary rotary metrology axes, wherein the primary and secondary rotary metrology axes are encoded respectively by first and second rotary encoders and/or substantially intersect.

17. A coordinate positioning arm as claimed in claim 16, wherein the primary and secondary rotary metrology axes are provided by a universal or Cardan or Hooke's joint.

18. A coordinate positioning arm as claimed in claim 13, wherein the primary rotational degree of freedom is for measuring primary rotation and the secondary degree of freedom is for measuring secondary rotation that is smaller than the primary rotation.

19. A coordinate positioning arm as claimed in claim 13, wherein, for at least one transverse metrology joint, one or more metrology axes arranged in series before that metrology joint provide the metrology joint with a tertiary rotational degree of freedom.

20. A coordinate positioning arm as claimed in claim 19, wherein at least one of the one or more metrology axes that provide the tertiary rotational degree of freedom form part of another transverse metrology joint.

21. A coordinate positioning arm as claimed in claim 19, wherein each transverse metrology joint is so provided with a tertiary rotational degree of freedom.

22. A coordinate positioning arm as claimed in claim 19, wherein the primary, secondary and tertiary degrees of freedom all pass through the metrology joint.

23. A coordinate positioning arm as claimed in claim 19, wherein a segment of the metrology frame that moves around the primary rotational degree of freedom is always within 45 degrees of either the secondary rotational degree of freedom or the tertiary rotational degree of freedom.

24. A coordinate positioning arm as claimed in claim 19, wherein a segment of the metrology frame that moves around the primary rotational degree of freedom is rotatable around its longitudinal axis for any rotation angle around the primary rotational degree of freedom, due to the secondary rotational degree of freedom or the tertiary rotational degree of freedom or a combination of these, depending on the rotation angle.

25. A coordinate positioning arm as claimed in claim 12, wherein the metrology frame comprises a further metrology joint not associated with or corresponding to any particular drive axis, wherein the further metrology joint is arranged between two transverse rotary metrology joints.

26. A coordinate positioning arm as claimed in claim 25, wherein the at least one further metrology joint comprises one or more metrology axes that provide a linear degree of freedom.

27. A coordinate positioning arm as claimed in claim 26, wherein the one or more metrology axes of the further metrology joint comprise a linear metrology axis or a combination of rotary metrology axes arranged to be substantially equivalent to a linear metrology axis.

28. A coordinate positioning arm as claimed in claim 27, wherein the linear degree of freedom is provided by two rotary metrology axes.

29. A coordinate positioning arm as claimed in claim 1, wherein the coordinate positioning arm is a coordinate measuring arm and wherein a surface sensing device such as a measurement probe is coupled to the head end.

30. A composite coordinate positioning arm comprising a plurality of coordinate positioning arms as claimed in claim 1 connected in series.

31. A manufacturing or assembly method in which a coordinate positioning arm according to claim 1 is used both to position one or more manufacturing or assembly tools for manufacturing or assembling an article and to position a measuring or inspection tool for measuring or inspecting the manufactured or assembled article.

* * * * *